(12) United States Patent
Kaino et al.

(10) Patent No.: US 11,232,590 B2
(45) Date of Patent: Jan. 25, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Akihiko Kaino, Kanagawa (JP); Masashi Eshima, Chiba (JP); Daiki Yamanaka, Tokyo (JP); Shunichi Homma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 88 days.

(21) Appl. No.: 16/608,522

(22) PCT Filed: Mar. 26, 2018

(86) PCT No.: PCT/JP2018/012018
§ 371 (c)(1),
(2) Date: Oct. 25, 2019

(87) PCT Pub. No.: WO2018/216342
PCT Pub. Date: Nov. 29, 2018

(65) Prior Publication Data
US 2021/0110574 A1  Apr. 15, 2021

(30) Foreign Application Priority Data

May 24, 2017  (JP) .............................. JP2017-102489

(51) Int. Cl.
*G06T 7/73* (2017.01)
*G01S 17/89* (2020.01)
(Continued)

(52) U.S. Cl.
CPC ................ *G06T 7/75* (2017.01); *G01S 17/89* (2013.01); *G06T 7/251* (2017.01); *G06T 7/521* (2017.01);
(Continued)

(58) Field of Classification Search
CPC ........... G06T 7/75; G06T 7/521; G06T 7/251; H04N 5/2256
See application file for complete search history.

(56) References Cited

U.S. PATENT DOCUMENTS

2002/0048027 A1* 4/2002 Pettersen ............. G01B 11/245
356/614
2002/0101506 A1* 8/2002 Suzuki .................. H04N 13/32
348/51

(Continued)

*Primary Examiner* — Peter D Le
(74) *Attorney, Agent, or Firm* — Paratus Law Group, PLLC

(57) ABSTRACT

There is provided an information processing apparatus to achieve both the stabilization of estimation of the distance to a target physical body and the suppression of power consumption. The information processing apparatus includes: a first estimation unit configured to estimate a distance between a prescribed visual point and a physical body in a real space on the basis of result of detection of light that is sent from a prescribed light sending unit toward the physical body and is reflected at the physical body; a second estimation unit configured to estimate at least either one of a position or an attitude in the real space of the prescribed visual point on the basis of result of estimation of the distance; and a control unit configured to control the light sent from the light sending unit in accordance with a situation regarding estimation of at least either one of the position or the attitude.

14 Claims, 9 Drawing Sheets

(51) Int. Cl.
  *G06T 7/521* (2017.01)
  *G06T 7/246* (2017.01)
  *G06T 17/00* (2006.01)
  *H04N 5/225* (2006.01)
  *G01S 17/894* (2020.01)
  *G01S 7/484* (2006.01)

(52) U.S. Cl.
  CPC ........... *G06T 17/00* (2013.01); *H04N 5/2256* (2013.01); *G01S 7/484* (2013.01); *G01S 17/894* (2020.01); *G06T 2207/10028* (2013.01)

(56) References Cited

U.S. PATENT DOCUMENTS

| | | | |
|---|---|---|---|
| 2003/0035098 A1* | 2/2003 | Ishiyama | G06K 9/00248 356/72 |
| 2005/0270369 A1* | 12/2005 | Nonaka | H04N 5/23241 348/61 |
| 2005/0275824 A1* | 12/2005 | Ohtomo | G01C 15/002 356/4.03 |
| 2006/0209195 A1* | 9/2006 | Goto | G02B 7/102 348/219.1 |
| 2009/0210193 A1* | 8/2009 | Nagase | F24F 11/30 702/152 |
| 2009/0225161 A1* | 9/2009 | Otani | G01C 11/12 348/135 |
| 2011/0193939 A1* | 8/2011 | Vassigh | G06F 3/017 348/46 |
| 2011/0293255 A1* | 12/2011 | Kikuchi | H04N 5/23212 396/80 |
| 2012/0105868 A1* | 5/2012 | Nomura | G01B 11/25 356/610 |
| 2012/0224164 A1* | 9/2012 | Hayashi | G01C 3/08 356/3 |
| 2012/0312960 A1* | 12/2012 | Mine | H04N 5/347 250/206 |
| 2013/0044917 A1* | 2/2013 | Kurokawa | G01S 7/483 382/106 |
| 2013/0107010 A1* | 5/2013 | Hoiem | G06K 9/46 348/47 |
| 2013/0108116 A1* | 5/2013 | Suzuki | G06T 7/75 382/106 |
| 2013/0155275 A1* | 6/2013 | Shimizu | H04N 5/23241 348/223.1 |
| 2013/0278917 A1* | 10/2013 | Korekado | G01S 7/4865 356/5.01 |
| 2014/0139632 A1* | 5/2014 | Livshitz | G01S 17/50 348/46 |
| 2014/0267623 A1* | 9/2014 | Bridges | G01B 11/2513 348/46 |
| 2014/0355003 A1* | 12/2014 | Masumura | G01B 11/30 356/600 |
| 2015/0116693 A1* | 4/2015 | Ohtomo | G01S 17/42 356/4.01 |
| 2015/0248762 A1* | 9/2015 | Li | G06T 7/73 382/203 |
| 2016/0037094 A1* | 2/2016 | Chang | G01S 17/06 356/5.01 |
| 2016/0059420 A1* | 3/2016 | Ji | H04N 5/2256 348/148 |
| 2016/0156420 A1* | 6/2016 | Druml | H04B 10/1149 398/40 |
| 2017/0011269 A1* | 1/2017 | Yamaguchi | G06K 9/00798 |
| 2017/0046845 A1* | 2/2017 | Boyle | G06T 7/73 |
| 2017/0059696 A1* | 3/2017 | Ohtomo | G01C 3/08 |
| 2017/0115393 A1* | 4/2017 | Nagai | G01S 7/4868 |
| 2017/0249752 A1* | 8/2017 | Kotake | G06T 7/73 |
| 2018/0275278 A1* | 9/2018 | Yamada | G01C 3/085 |
| 2018/0348373 A1* | 12/2018 | Chen | H04N 5/2256 |
| 2020/0081094 A1* | 3/2020 | Furukawa | G01S 17/08 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/012018 (filed on Mar. 26, 2018) under 35 U.S.C. § 371, which claims priority to Japanese Patent Application No. 2017-102489 (filed on May 24, 2017), which are all hereby incorporated by reference in their entirety.

TECHNICAL FIELD

The present disclosure relates to an information processing apparatus, an information processing method, and a program.

BACKGROUND ART

In computer vision fields, technologies of the estimation of the self-position of a device, such as "simultaneous localization and mapping (SLAM)", "iterative closest point (ICP)", and "visual odometry", and technologies of the 3D modeling of a surrounding environment structure, such as "multi-view stereo" and "structure from motion", are drawing attention. To embody these technologies, the ability to stably estimate the distance (depth information) from a prescribed apparatus to a target point in the surrounding environment of the apparatus is an important elemental technology. In particular, these days, inexpensive depth sensors employing active irradiation systems such as "structured light", "patterned light", and "time of flight" are becoming widespread as devices for acquiring depth information. Note that Patent Document 1 discloses, as a relevant technology, an example of technology in which light is sent from a light sending means to a detection area and the light is received by a light receiving means, and thereby a body to be detected that is located in the detection area is detected.

Further, improvements in the processing precision and the robustness of self-position estimation and 3D modeling are becoming possible by using various sensing devices such as an image sensor, a gyro sensor, and an acceleration sensor, and calculation devices such as a CPU and a GPU. Thus, the practical application areas of the self-position estimation technology mentioned above and the 3D modeling technology mentioned above are becoming wider, and particularly these days also applications to mobile body devices, mobile devices, and the like are investigated.

CITATION LIST

Patent Document

Patent Document 1: Japanese Patent Application Laid-Open No. 2003-194962

SUMMARY OF THE INVENTION

Problems to be Solved by the Invention

Meanwhile, the distance measurement range and the distance measurement precision of a depth sensor employing the active irradiation system tend to depend on the power of a device that applies light (sends light), and power consumption may become larger with the stabilization of estimation of the distance to a target physical body. Influences due to the increase in power consumption appear more significantly particularly in devices in which the amount of usable electric power is limited, such as mobile body devices and mobile devices. From such a background, it is desired to embody a technology that can achieve both the stabilization of estimation of the distance to a target physical body and the suppression of power consumption in a case where the active irradiation system is employed.

Thus, the present disclosure proposes an information processing apparatus, an information processing method, and a program that can achieve both the stabilization of estimation of the distance to a target physical body and the suppression of power consumption.

Solutions to Problems

According to the present disclosure, there is provided an information processing apparatus including: a first estimation unit configured to estimate a distance between a prescribed visual point and a physical body in a real space on the basis of result of detection of light that is sent from a prescribed light sending unit toward the physical body and is reflected at the physical body; a second estimation unit configured to estimate at least either one of a position or an attitude in the real space of the prescribed visual point on the basis of result of estimation of the distance; and a control unit configured to control the light sent from the light sending unit in accordance with a situation regarding estimation of at least either one of the position or the attitude.

Further, according to the present disclosure, there is provided an information processing method, in which a computer performs estimating a distance between a prescribed visual point and a physical body in a real space on the basis of result of detection of light that is sent from a prescribed light sending unit toward the physical body and is reflected at the physical body, estimating at least either one of a position or an attitude in the real space of a prescribed visual point on the basis of result of estimation of the distance, and controlling the light sent from the light sending unit in accordance with a situation regarding estimation of at least either one of the position or the attitude.

Further, according to the present disclosure, there is provided a program for causing a computer to execute the processing of: estimating a distance between a prescribed visual point and a physical body in a real space on the basis of result of detection of light that is sent from a prescribed light sending unit toward the physical body and is reflected at the physical body; estimating at least either one of a position or an attitude in the real space of a prescribed visual point on the basis of result of estimation of the distance; and controlling the light sent from the light sending unit in accordance with a situation regarding estimation of at least either one of the position or the attitude.

Effects of the Invention

As described above, according to the present disclosure, an information processing apparatus, an information processing method, and a program that can achieve both the stabilization of estimation of the distance to a target physical body and the suppression of power consumption are provided.

Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
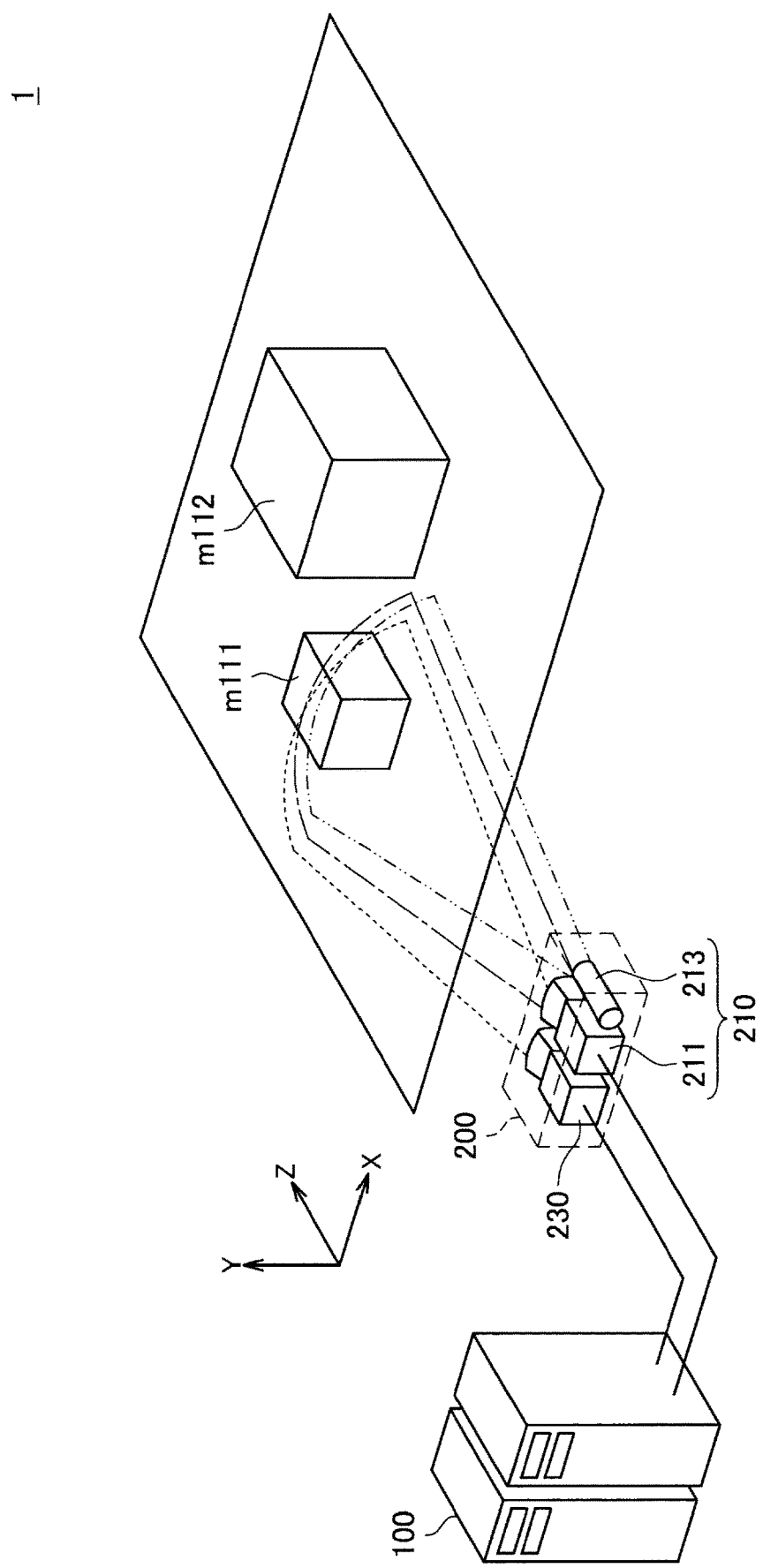
FIG. 1 is a diagram showing an example of a rough system configuration of an information processing system according to an embodiment of the present disclosure.

Hereinafter, (a) preferred embodiment(s) of the present disclosure will be described in detail with reference to the appended drawings. Note that, in this specification and the appended drawings, components that have substantially the same functional configuration are denoted with the same reference numerals, and repeated explanation of these structural elements is omitted.

Note that the description is given in the following order.
1. Rough configuration
2. Study on depth estimation employing active irradiation system
3. Technical features
   3.1. Functional configuration
   3.2. Processing
   3.3. Example
   3.4. Modification examples
4. Hardware configuration
5. Conclusions 1. Rough Configuration First, an example of a rough system configuration of an information processing system according to an embodiment of the present disclosure is described with reference to FIG. 1. FIG. 1 is a diagram showing an example of a rough system configuration of an information processing system according to the present embodiment.

As shown in FIG. 1, an information processing system 1 according to the present embodiment includes a mobile body 200 that is an object of the estimation of the position and attitude in the real space and an information processing apparatus 100. The information processing apparatus 100 and the mobile body 200 are configured to be able to mutually transmit and receive information via a prescribed network, for example. Note that the type of the network that connects the information processing apparatus 100 and the mobile body 200 together is not particularly limited. As a specific example, such a network N1 may be constituted by what is called a wireless network, such as a network based on the standard of LTE, Wi-Fi (registered trademark), or the like. Further, the network N1 may be constituted by the Internet, an exclusive line, a local area network (LAN), a wide area network (WAN), or the like. Further, the network N1 may include a plurality of networks, and at least part of the networks may be configured as a wired network.

Further, in FIG. 1, reference characters m111 and m112 schematically show physical bodies located in the real space. Note that, hereinafter, the physical body located in the real space is also referred to as a "real object".

The mobile body 200 corresponds to a physical body that is an object of the estimation of the position and attitude in the real space, as described above. Specific examples of the mobile body 200 include a device used by being mounted on a user, such as an eyeglass-type wearable device, a portable device such as a smartphone, a movable apparatus (a mobile body) such as a vehicle, etc.

The mobile body 200 includes various devices for acquiring information used for the estimation of the position and attitude in the real space of the mobile body 200 itself on the basis of the technology of what is called self-position estimation. For example, as shown in FIG. 1, the mobile body 200 according to the present embodiment includes a depth sensor 210 and an imaging unit 230. Each of the depth sensor 210 and the imaging unit 230 may be held by a casing of the mobile body 200.

The depth sensor 210 acquires information for estimating the distance between a prescribed visual point and a physical body located in the real space (in other words, the distance between the mobile body 200 and the physical body), and transmits the acquired information to the information processing apparatus 100. Note that, in the following description, information indicating the distance between a prescribed visual point and a physical body located in the real space is also referred to as "depth information".

In particular, in the information processing system 1 according to the present embodiment, the depth sensor 210 is configured as a depth sensor employing the active irradiation system. Hence, for example, the depth sensor 210 includes a light sending unit 213 that sends light toward a physical body in the real space and a detection unit 211 that detects light that is sent from the light sending unit 213 and is reflected at the physical body (for example, objects m111 and m112 shown in FIG. 1, etc.). A light source that sends light of a prescribed wavelength may be used as the light sending unit 213. Further, the light sending unit 213 may be configured to be able to control, for example, the timing for sending light, the irradiation range of light, the irradiation direction of light, etc. Further, an image sensor, a photoelectric sensor, or the like that can detect light of a prescribed wavelength (more specifically, light sent from the light sending unit 213), for example, may be used as the detection unit 211.

The imaging unit 230 captures an image of a region in the real space located in a prescribed direction with respect to the mobile body 200, and transmits the captured image to the information processing apparatus 100.

Note that it is preferable that the imaging unit 230 be configured to be able to capture an image of at least a partial region of a region that is an object of the acquisition of information by the depth sensor 210 (that is, a region that is an object of the estimation of the distance to a physical body). That is, it is preferable that the imaging unit 230 and the depth sensor 210 be held to the casing of the mobile body 200 such that at least part of a region that is set as an object of the acquisition of information by the depth sensor 210 (hereinafter, also referred to as a "detection region") and at least part of a region of which an image is to be captured by the imaging unit 230 (hereinafter, also referred to as an "imaging region") overlap with each other.

The information processing apparatus 100 may be configured as a server or the like, for example. The information processing apparatus 100 acquires, from the mobile body 200 via a prescribed network, each of information acquired by the depth sensor 210 (that is, information for the estimation of the distance to a physical body) and an image captured by the imaging unit 230. Then, for example, using the acquired information and image as inputs, the information processing apparatus 100 estimates the position and attitude in the real space of the mobile body 200 on the basis of self-position estimation technology. Further, using the acquired information and image as inputs, the information processing apparatus 100 may reproduce the position, attitude, shape, etc. of a physical body (a real object) existing in the real space around the mobile body 200, as a three-dimensional model (hereinafter, also referred to as a "three-dimensional space model"), on the basis of 3D modeling technology.

Note that examples of the self-position estimation technology include "simultaneous localization and mapping (SLAM)", "iterative closest point (ICP)", "visual odometry", etc. Here, an overview of the technology referred to as SLAM is described below.

SLAM is a technology that performs the estimation of the self-position and the creation of an environment map in parallel by using an imaging unit such as a camera, various sensors, an encoder, etc. As a more specific example, in SLAM (particularly visual SLAM), the three-dimensional shapes of imaged scenes (or subjects) are successively reconstructed on the basis of moving images captured by an imaging unit. Then, the result of reconstruction of imaged scenes is associated with the result of detection of the position and attitude of the imaging unit, and thereby the creation of a map of a surrounding environment and the estimation of the position and attitude of the imaging unit in the environment are performed. Note that, by providing, for example, various sensors such as an acceleration sensor and an angular velocity sensor in the apparatus in which the imaging unit is held, the position and attitude of the imaging unit can be estimated as information indicating relative changes on the basis of the detection result of the sensors. As a matter of course, the method for estimating the position and attitude of the imaging unit is not necessarily limited to a method based on the sensing result of various sensors such as an acceleration sensor and an angular velocity sensor as long as the estimation is possible.

Further, examples of the 3D modeling technology that reproduces a surrounding environment structure of a device as a three-dimensional space model include "multi-view stereo", "structure from motion", etc.

Note that the configuration described above is only an example, and the system configuration of the information processing system 1 according to the present embodiment is not necessarily limited to the example shown in FIG. 1. As a specific example, the mobile body 200 and the information processing apparatus 100 may be integrated together. Further, at least part of the depth sensor 210 and the imaging unit 230 may be provided outside the mobile body 200. Further, although the example shown in FIG. 1 shows the depth sensor 210 and the imaging unit 230 individually, one of them may have a function of the other. As a specific example, the imaging unit 230 may be configured as what is called a camera, and may thereby have a function as the depth sensor 210.

Hereinabove, an example of a rough system configuration of an information processing system according to an embodiment of the present disclosure is described with reference to FIG. 1.

2. Study on Depth Estimation Employing Active Irradiation System

Next, an overview of depth estimation employing the active irradiation system is described for easier understanding of features of the information processing system according to the present embodiment, and then issues of the information processing system according to the present embodiment are organized.

To embody the self-position estimation technology and the technology of the 3D modeling of a surrounding environment structure described above, the ability to stably estimate the distance (depth information) from a prescribed apparatus (for example, the mobile body 200) to a target point in the surrounding environment of the apparatus is an important elemental technology. Examples of such a technology that can stably estimate depth information include technologies of depth estimation employing active irradiation systems such as "structured light", "patterned light", and "time of flight". Specifically, in depth estimation employing the active irradiation system, light is applied to a physical body in the real space and reflected light reflected at the physical body is detected, and thereby the distance to the physical body is estimated.

In particular, these days, inexpensive depth sensors employing the active irradiation system are becoming widespread. Further, improvements in the processing precision and the robustness of self-position estimation and 3D modeling are becoming possible by using various sensing devices such as an image sensor, a gyro sensor, and an acceleration sensor, and calculation devices such as a CPU and a GPU. From such a background, the practical application areas of the self-position estimation technology mentioned above and the 3D modeling technology mentioned above are becoming wider. Specific examples of major applications of these technologies include the autonomous control of a mobile body typified by an automobile, a drone, a robot, or the like. Further, as other examples, these technologies are applied to the embodiment of virtual reality (MR) and augmented reality (AR) using a smartphone, a tablet, a head-mounted display, or the like.

On the other hand, in a case where the active irradiation system is employed, power consumption tends to be larger than in a case where a passive system that does not involve the sending of light to a physical body is employed. Further, the distance measurement range and the distance measurement precision of a depth sensor of an irradiation type tend to depend on the power of a device that applies light (sends light); in a case where it is attempted to improve the distance measurement range and the distance measurement precision more, power consumption increases in proportion. Influences due to the increase in power consumption appear more significantly particularly in devices in which the amount of usable electric power is limited, such as mobile body devices and mobile devices.

In view of circumstances like the above, the present disclosure proposes a technology that can achieve both the stabilization of estimation of the distance to a target physical body and the suppression of power consumption in a case where the active irradiation system is employed. In the following, technical features of the information processing system 1 according to the present embodiment are described in more detail.

3. Technical Features

Hereinbelow, technical features of the information processing system 1 according to the present embodiment are described.

3.1. Functional Configuration

Figure 2:
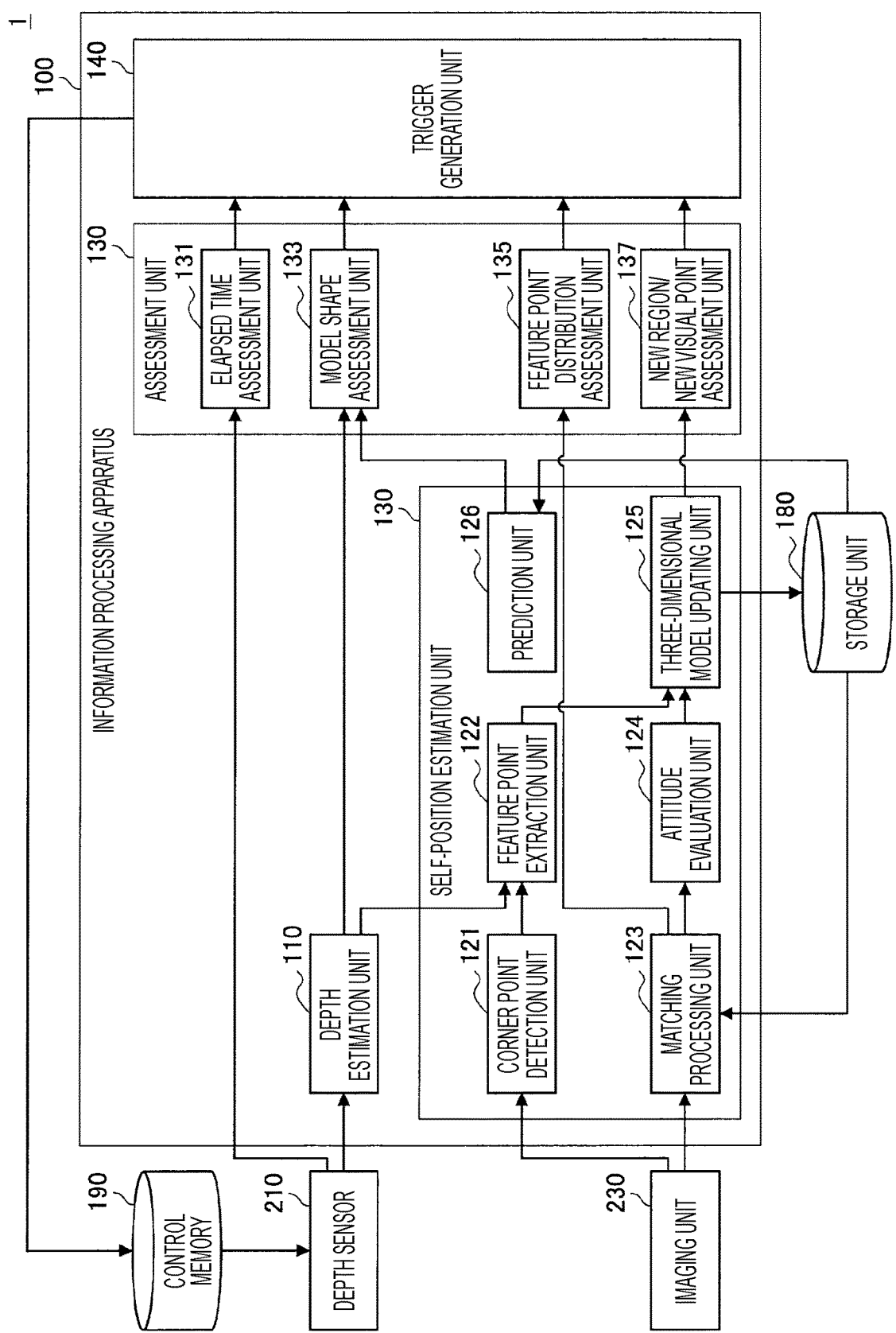
FIG. 2 is a block diagram showing an example of a functional configuration of an information processing system according to the present embodiment.

First, an example of a functional configuration of the information processing system 1 according to the present embodiment is described with reference to FIG. 2, with attention particularly on the configuration of the information processing apparatus 100. FIG. 2 is a block diagram showing an example of a functional configuration of the information processing system 1 according to the present embodiment.

As shown in FIG. 2, the information processing system 1 according to the present embodiment includes the information processing apparatus 100, the depth sensor 210, the imaging unit 230, a storage unit 180, and a control memory 190. Note that the depth sensor 210 and the imaging unit 230 correspond to the depth sensor 210 and the imaging unit 230 described above with reference to FIG. 1, and therefore a detailed description is omitted.

The storage unit 180 is a storage region for storing various data temporarily or constantly.

The control memory 190 is a storage region on which the information processing apparatus 100 writes various pieces of control information in order to control the operation of the depth sensor 210. That is, on the basis of control information (for example, a trigger or the like) written on the control memory 190, the depth sensor 210 switches operation related to the acquisition of information for the estimation of the distance to a physical body in the real space. Thus, the information processing apparatus 100 can control the operation of the depth sensor 210 via the control memory 190.

Next, the configuration of the information processing apparatus 100 is described. As shown in FIG. 2, the information processing apparatus 100 includes a depth estimation unit 110, a self-position estimation unit 120, an assessment unit 130, and a trigger generation unit 140.

The depth estimation unit 110 acquires, from the depth sensor 210, information according to the result of detection by the depth sensor 210, and estimates the distance between a prescribed visual point and a physical body located in the real space on the basis of the acquired information.

As a specific example, in a case where the depth sensor 210 employs the TOF system, the time from when light such as infrared light is sent to a physical body located in the real space to when the contributed light has returned after reflection at the subject is measured for each pixel of an image sensor. Thus, in accordance with the time measured for each pixel, the depth estimation unit 110 can measure the distance to the subject (that is, the physical body mentioned above) corresponding to the pixel.

Further, as another example, in a case where the depth sensor 210 employs the structured light system, a pattern is applied to a physical body located in the real space by means of light such as infrared light, and the pattern is captured as an image. Thus, on the basis of a change of the pattern obtained from the imaging result, the depth estimation unit 110 can measure the distance to the subject (that is, the physical body mentioned above) for each pixel of the image sensor.

On the basis of a configuration like the above, the depth estimation unit 110 generates a depth map in which the result of estimation of the distance between a prescribed visual point and a physical body located in the real space is mapped on an imaging plane, and outputs the generated depth map to the self-position estimation unit 120 (a feature point extraction unit 122). Further, the depth estimation unit 110 may output the generated depth map to the assessment unit 130 (a model shape assessment unit 133) described later. Note that the depth estimation unit 110 corresponds to an example of a "first estimation unit".

The self-position estimation unit 120 estimates at least either one of the position or attitude in the real space of a prescribed object. Note that, in the present description, for the sake of convenience, it is assumed that the self-position estimation unit 120 estimates the position and attitude in the real space of the mobile body 200 shown in FIG. 1 in which the depth sensor 210 and the imaging unit 230 are held to the casing. Further, the self-position estimation unit 120 corresponds to an example of a "second estimation unit".

As shown in FIG. 2, the self-position estimation unit 120 includes a corner point detection unit 121, a feature point extraction unit 122, a matching processing unit 123, an attitude evaluation unit 124, a three-dimensional model updating unit 125, and a prediction unit 126.

The corner point detection unit 121 acquires, from the imaging unit 230, an image captured by the imaging unit 230 (that is, an image of the real space). For example, the corner point detection unit 121 performs image analysis processing on an acquired image to extract texture information from the image, and detects corner points from the image on the basis of the extracted texture information. Note that the corner point corresponds to a point of intersection of a plurality of edges, in other words, it can be defined as a point at which a plurality of conspicuous edges in different directions exists in the vicinity of a certain part. Then, the corner point detection unit 121 outputs information indicating the result of detection of corner points obtained from the acquired image to the feature point extraction unit 122.

The feature point extraction unit 122 acquires a depth map from the depth estimation unit 110. Further, the feature point extraction unit 122 acquires, from the corner point detection unit 121, information indicating the result of detection of corner points. The feature point extraction unit 122 performs, for each of the detected corner points, the extraction of information indicating the result of measurement of the corresponding distance (in other words, depth information) from the acquired depth map and the association with the depth information, and thereby prescribes feature points having three-dimensional position information. In the above way, feature points are extracted from the image captured by the imaging unit 230. Then, the feature point extraction unit 122 outputs information indicating the result of extraction of feature points to the three-dimensional model updating unit 125.

The three-dimensional model updating unit 125 acquires, from the feature point extraction unit 122, information indicating the result of extraction of feature points. The three-dimensional model updating unit 125 unifies the extracted feature points into a three-dimensional space model on the basis of the acquired information. Note that, as described above, the three-dimensional space model is a model in which the position, attitude, shape, etc. of the physical body existing in the real space (the real object) are three-dimensionally reproduced. Further, data unified as the three-dimensional space model are held in the storage unit 180, for example. By a configuration like the above, feature points are newly extracted, and thereby results of extraction of feature points are sequentially unified into a three-dimensional space model. Further, feature points unified as a three-dimensional space model are treated as tracking points in the subsequent frames.

Further, the three-dimensional model updating unit 125 may acquire, from the attitude evaluation unit 124 described later, information indicating the result of estimation of the position and attitude in the real space of the mobile body 200. In this case, the three-dimensional model updating unit 125 is only required to unify extracted feature points into a three-dimensional space model in accordance with the position and attitude in the real space of the mobile body 200.

Further, in a case where the three-dimensional model updating unit 125 has updated a three-dimensional space model by unifying the result of extraction of feature points into the three-dimensional space model, the three-dimensional model updating unit 125 may notify information indicating the updated result to the assessment unit 130 (a new region/new visual point assessment unit 137) described later. By such a configuration, the assessment unit 130 can assess whether information corresponding to feature points that are newly unified into a three-dimensional space model was included in the three-dimensional space model before the unification or not. Thus, the assessment unit 130 can assess, for example, also whether feature points are extracted for another region of which the feature points have not been acquired in the past (hereinafter, also referred to as a "new region") or not and whether another visual point that has not been detected in the past (hereinafter, also referred to as a "new visual point") is detected or not.

The matching processing unit 123 and the attitude evaluation unit 124 are configurations for estimating the position and attitude in the real space of the mobile body 200 on the basis of matching between an image captured by the imaging unit 230 and a three-dimensional space model held in the storage unit 180.

Specifically, the matching processing unit 123 acquires, from the imaging unit 230, an image captured by the imaging unit 230. On the basis of information regarding tracking points (that is, feature points) included in a three-dimensional space model held in the storage unit 180, the matching processing unit 123 calculates positions on the image corresponding to the tracking points on the basis of matching between the three-dimensional space model and the image. Then, the matching processing unit 123 outputs information indicating the result of the matching to the attitude evaluation unit 124. Further, the matching processing unit 123 may output information indicating the result of the matching to the assessment unit 130 (a feature point distribution assessment unit 135) described later.

The attitude evaluation unit 124 estimates the position and attitude in the real space of the imaging unit 230 (in turn, the mobile body 200) on the basis of the result of the above matching by the matching processing unit 123. Specifically, in a case where pairs of the three-dimensional positions of tracking points and positions on an image corresponding to the tracking points are given, the attitude evaluation unit 124 estimates the position and attitude in the real space of the imaging unit 230 on the basis of a prescribed algorithm. Note that examples of the algorithm include a PnP algorithm, an N-point algorithm, or the like.

Then, the attitude evaluation unit 124 outputs information indicating the result of estimation of the position and attitude in the real space of the imaging unit 230 (in turn, the mobile body 200) to the three-dimensional model updating unit 125. In this event, on the basis of the estimation result, the three-dimensional model updating unit 125 may amend the three-dimensional positions of tracking points (that is, feature points) included in a three-dimensional space model.

The prediction unit 126 extracts the depth information of feature points that are predicted to be observed in accordance with the current position and attitude of the imaging unit 230 (in turn, the mobile body 200), with reference to a three-dimensional space model (that is, a generated or updated three-dimensional space model) held in the storage unit 180 and on the basis of a distribution (for example, points or faces) of feature points extracted in the past. Then, the prediction unit 126 outputs information indicating the result of extraction of the depth information of the feature points to the assessment unit 130 (a model shape assessment unit 133) described later, as the result of prediction of the depth information of the feature points.

The assessment unit 130 assesses various pieces of information related to the estimation of the position and attitude in the real space of the mobile body 200. For example, as shown in FIG. 2, the assessment unit 130 may include at least one of an elapsed time assessment unit 131, a model shape assessment unit 133, a feature point distribution assessment unit 135, or a new region/new visual point assessment unit 137.

The elapsed time assessment unit 131 monitors the elapsed time (for example, the number of frames) from when the depth sensor 210 (the light sending unit 213) started or ended the sending of light, and assesses whether the elapsed time has exceeded a prescribed period or not in accordance with the monitoring result. Then, the elapsed time assessment unit 131 notifies the assessment result to the trigger generation unit 140 described later.

As a specific example, in a case where the period during which the sending of light is performed by the depth sensor 210 (hereinafter, also referred to as a "light sending period") has continued for more than a prescribed period, the elapsed time assessment unit 131 notifies this fact to the trigger generation unit 140. Further, in a case where the period during which the sending of light by the depth sensor 210 is not performed (hereinafter, also referred to as a "light extinction period") has continued for more than a prescribed period, the elapsed time assessment unit 131 notifies this fact to the trigger generation unit 140.

The model shape assessment unit 133 acquires, from the prediction unit 126, the result of prediction of the depth information of feature points that are predicted to be observed in accordance with the current position and attitude of the mobile body 200. Further, the model shape assessment unit 133 acquires a depth map from the depth estimation unit 110. Note that the acquired depth map includes the depth information of each of feature points that are actually observed in accordance with the current position and attitude of the mobile body 200. Then, the model shape assessment unit 133 compares the acquired depth map (in other words, the result of actual observation of the depth information of feature points) and the result of prediction of the depth information of feature points that are predicted to be observed, and notifies the comparison result to the trigger generation unit 140.

As a specific example, in a case where the gap between the result of actual observation of the depth information of feature points and the result of prediction of the depth information of the feature points has exceeded a threshold, the model shape assessment unit 133 notifies the trigger generation unit 140 that a gap has occurred between the observation result and the prediction result.

The feature point distribution assessment unit 135 acquires, from the matching processing unit 123, information indicating the result of matching between an image captured by the imaging unit 230 and a three-dimensional space model. Then, on the basis of the matching result, the feature point distribution assessment unit 135 assesses the status of the tracking of the position and attitude in the real space of the imaging unit 230 (in turn, the mobile body 200), and notifies the assessment result to the trigger generation unit 140 described later.

As a specific example, the feature point distribution assessment unit 135 may assess whether the number of successfully tracked feature points has become less than a threshold or not on the basis of the result of the matching mentioned above, and may notify the assessment result to the trigger generation unit 140. Further, as another example, the feature point distribution assessment unit 135 may evaluate the distribution of successfully tracked feature points on the basis of the result of the matching mentioned above, and may notify the evaluation result to the trigger generation unit 140. As a more specific example, in a case where unevenness has occurred in the distribution of successfully tracked feature points, the feature point distribution assessment unit 135 may notify the trigger generation unit 140 of information regarding a partial region where the number of such feature points is less than a threshold.

The new region/new visual point assessment unit 137 acquires information indicating the result of updating of a three-dimensional space model from the three-dimensional model updating unit 125. In accordance with the result of updating of a three-dimensional space model, the new region/new visual point assessment unit 137 assesses whether feature points are extracted for a new region or not and whether a new visual point is detected or not, and notifies the assessment result to the trigger generation unit 140 described later.

Figure 3:
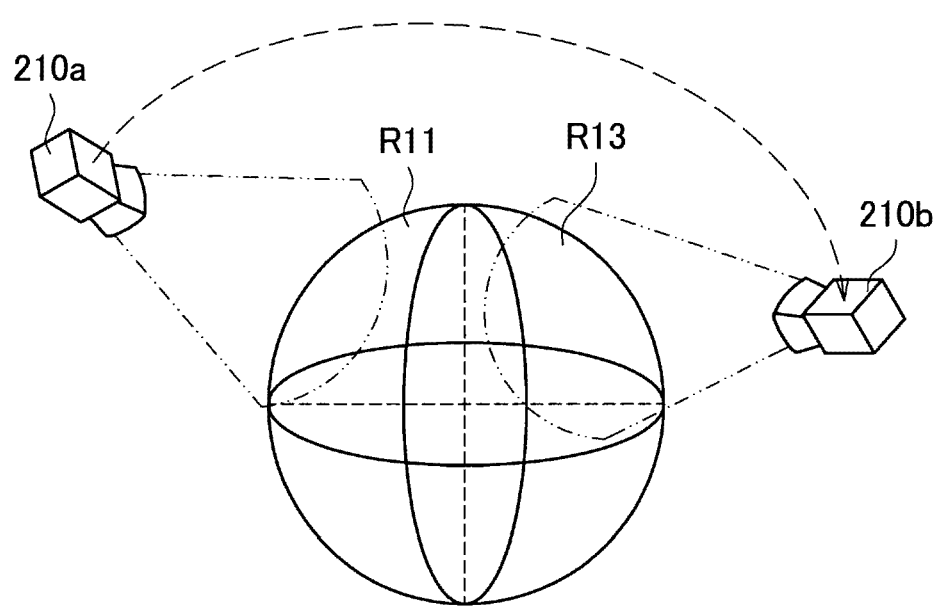
FIG. 3 is an explanatory diagram for describing a new region and a new visual point related to the generation and updating of a three-dimensional space model.

For example, FIG. 3 is an explanatory diagram for describing a new region and a new visual point related to the generation and updating of a three-dimensional space model. In the example shown in FIG. 3, spherical information divided in N equal parts is prescribed for a point group (or a voxel volume) of one or more feature points included in a three-dimensional space model, and a flag is attached to a region of the spherical information where light is sent from the light sending unit 213, in accordance with the position and attitude of the depth sensor 210.

For example, in FIG. 3, each of reference characters 210*a* and 210*b* schematically shows the position of a visual point indicating the relative position and attitude of the depth sensor 210 with respect to the spherical information prescribed in the above manner. For example, in a case where the depth sensor 210 is located in visual point position 210*a*, a partial region marked with reference character R11 of the spherical information is irradiated with light sent by the light sending unit 213 of the depth sensor 210. That is, in this case, a flag is attached to partial region R11. Further, in a case where the depth sensor 210 is located in visual point position 210*b*, a partial region marked with reference character R13 of the spherical information is irradiated with light sent by the light sending unit 213 of the depth sensor 210. That is, in this case, a flag is attached to partial region R13.

It is assumed that, in such a configuration, the position and attitude of the depth sensor 210 have changed from visual point position 210*a* to visual point position 210*b*, for example. In this event, in a case where a flag is not set in partial region R13, the situation is that the extraction of feature points from partial region R13 has not been performed. In such a case, partial region R13 corresponds to a new region where feature points have not been extracted, and visual point position 210*b* corresponds to a new visual point newly detected.

Next, the trigger generation unit 140 is described. The trigger generation unit 140 controls the operation of the light sending unit 213 of the depth sensor 210 via the control memory 190 in accordance with the result of various assessments by the assessment unit 130. That is, the trigger generation unit 140 corresponds to an example of a "control unit".

For example, the trigger generation unit 140 may switch the presence or absence of the sending of light by the light sending unit 213 on the basis of assessment result notified from the elapsed time assessment unit 131. Specifically, in a case where a light sending period has continued for more than a prescribed period, the trigger generation unit 140 generates a trigger for limiting the sending of light by the light sending unit 213, and writes the trigger on the control memory 190. Similarly, in a case where a light extinction period has continued for more than a prescribed period, the trigger generation unit 140 generates a trigger for starting the sending of light by the light sending unit 213, and writes the trigger on the control memory 190. By such control, for example, the light sending unit 213 sends light intermittently in units of a prescribed period; thus, power consumption can be suppressed to a lower level than in a case where the light sending unit 213 sends light continuously. Note that also a situation where a plurality of light sending units 213 sends lights individually can be envisaged like in a case where a plurality of devices (for example, a plurality of mobile bodies 200) is operated in cooperation. In such a case, the trigger generation unit 140 may control the light sending timing of each of a plurality of light sending units 213 (for example, light sending units 213 corresponding to a plurality of devices) such that each light sending unit 213 sends light in a time division manner. Note that, in this case, the elapsed time assessment unit 131 is only required to monitor each elapsed time from when each depth sensor 210 (each light sending unit 213) started or ended the sending of light and to notify the trigger generation unit 140 of the assessment result mentioned above corresponding to each depth sensor 210. Thereby, the trigger generation unit 140 can recognize the timing at which each depth sensor 210 is to send light.

The trigger generation unit 140 may limit the sending of light by the light sending unit 213 on the basis of assessment result notified from the model shape assessment unit 133. Specifically, the trigger generation unit 140 may cause the light sending unit 213 to send light in a case where the gap between the result of actual observation of the depth information of feature points and the result of prediction of the depth information of the feature points has exceeded a threshold. Note that, in other cases, the trigger generation unit 140 may limit the sending of light by the light sending unit 213. By such control, opportunities when the light sending unit 213 sends light are limited, and therefore power consumption can be suppressed to a low level.

The trigger generation unit 140 may limit the sending of light by the light sending unit 213 on the basis of assessment result notified from the feature point distribution assessment unit 135. As a specific example, the trigger generation unit 140 may cause the light sending unit 213 to send light in a case where the number of successfully tracked feature points has become less than a threshold. Note that, in other cases, the trigger generation unit 140 may limit the sending of light by the light sending unit 213. By such control, opportunities when the light sending unit 213 sends light are limited, and therefore power consumption can be suppressed to a low level.

Further, as another example, in a case where unevenness has occurred in the distribution of successfully tracked feature points, the trigger generation unit 140 may control the direction in which the light sending unit 213 sends light and the irradiation range of the light such that light is applied limitedly toward a partial region where the number of such feature points is less than a threshold. By such control, the amount of light sent by the light sending unit 213 is limited, and therefore power consumption can be suppressed to a low level.

The trigger generation unit 140 may limit the sending of light by the light sending unit 213 on the basis of assessment result notified from the new region/new visual point assessment unit 137. As a specific example, the trigger generation unit 140 may cause the light sending unit 213 to send light in a case where feature points are extracted for a new region or in a case where a new visual point is detected. Note that, in other cases, the trigger generation unit 140 may limit the sending of light by the light sending unit 213. By such control, opportunities when the light sending unit 213 sends light are limited, and therefore power consumption can be suppressed to a low level.

Note that the control related to the sending of light by the light sending unit 213 described above is only an example, and the operation of the information processing apparatus 100 according to the present embodiment is not necessarily limited to the example described above. That is, as long as the sending of light by the light sending unit 213 can be controlled in accordance with a situation that can be assessed on the basis of information that can be acquired in the course of processing related to the estimation of the position and attitude in the real space of the mobile body 200, the conditions of the assessment and the content of the control are not particularly limited.

For example, the obtained information varies in accordance with the distance (that is, the observed distance) between the mobile body 200 (the depth sensor 210) and a certain target object in the real space. Specifically, in a case where the mobile body 200 and the target object are distant from each other, information (for example, information regarding feature points) can be acquired over a large area of the light sending unit 213. In contrast, in a case where the mobile body 200 and the target object are located nearer to each other, although the region in the real space from which information can be acquired is limited, more detailed information can be acquired for the target object. By utilizing such characteristics, for example, even in a situation where a target object observed in the past is observed again, control can be made such that light is sent by the light sending unit 213 in a case where there is information (for example, information regarding feature points) that has not been acquired due to a difference in observed distance.

Further, operation related to the sending of light by the light sending unit 213 may be controlled on the basis of an instruction from the user via a predetermined input unit. As a specific example, the interval at which the light sending unit 213 sends light intermittently may be controlled on the basis of an instruction from the user. Further, as another example, the irradiation range of light sent from the light sending unit 213 and the direction in which the light is sent may be controlled on the basis of an instruction from the user. More specifically, in a case where the information processing apparatus 100 has received the designation of a region of interest (ROI) from the user, the information processing apparatus 100 may control the irradiation direction and the irradiation range of light such that light is sent from the light sending unit 213 toward a region in the real space corresponding to the ROI.

Further, the configuration described above is only an example, and the functional configuration of the information processing system 1 according to the present embodiment is not necessarily limited to the example shown in FIG. 2. As a specific example, the information processing apparatus 100, the depth sensor 210, and the imaging unit 230 may be integrated together. Further, the storage unit 180 may be provided in the interior of the information processing apparatus 100. Further, as another example, part of the configurations of the information processing apparatus 100 may be provided outside the information processing apparatus 100. Further, for example, the depth estimation unit 110 may be provided on the depth sensor 210 side. Further, as another example, part of the configurations of the self-position estimation unit 120, the assessment unit 130, and the trigger generation unit 140 may be provided in another apparatus such as a server. Further, each function of the information processing apparatus 100 may be achieved by a plurality of apparatuses cooperating together.

Hereinabove, an example of a functional configuration of the information processing system 1 according to the present embodiment is described with reference to FIG. 2 and FIG. 3, with attention particularly on the configuration of the information processing apparatus 100.

3.2. Processing

Figure 4:
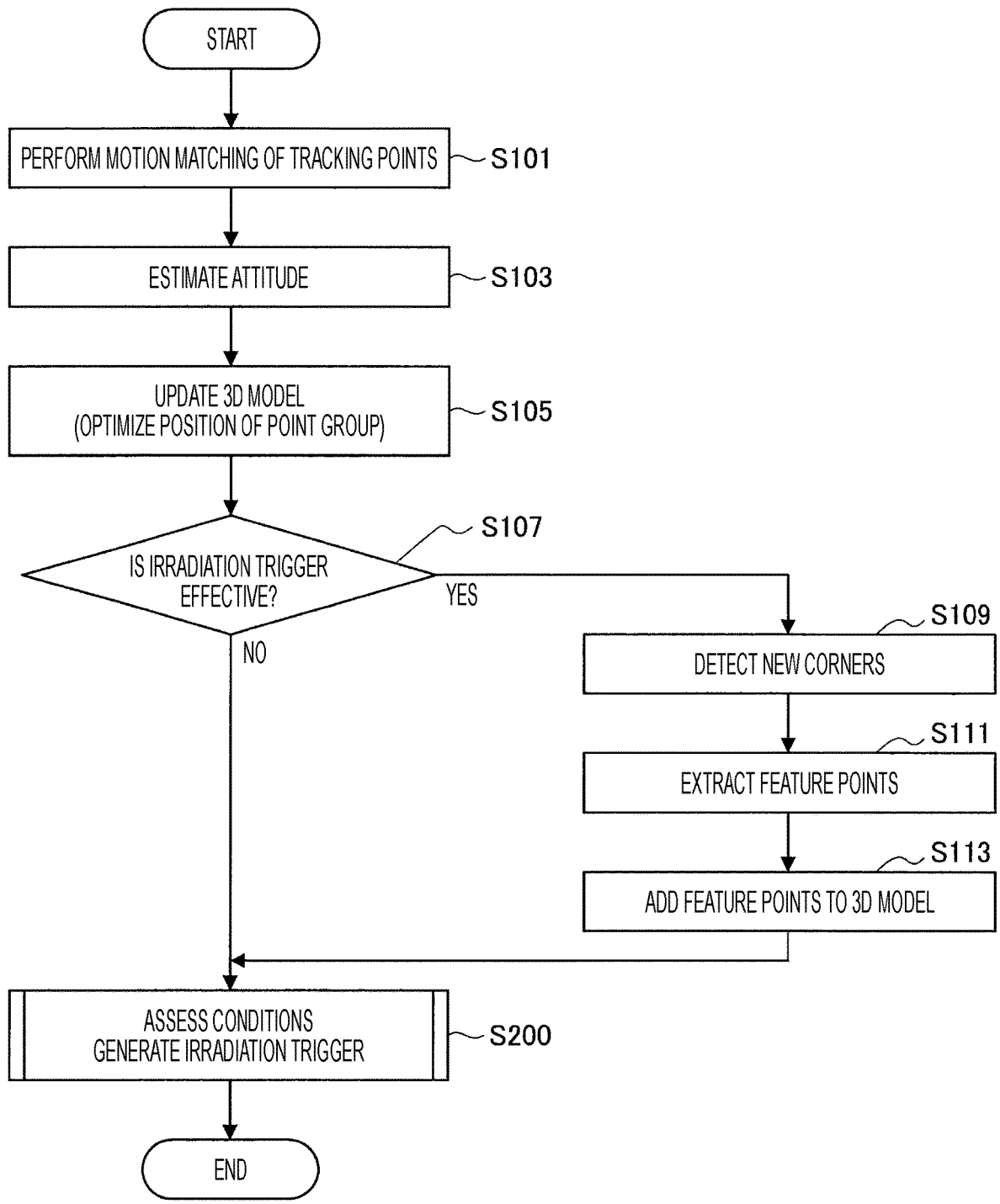
FIG. 4 is a flow chart showing an example of a procedure of a series of processing of an information processing system according to the embodiment.
Figure 5:
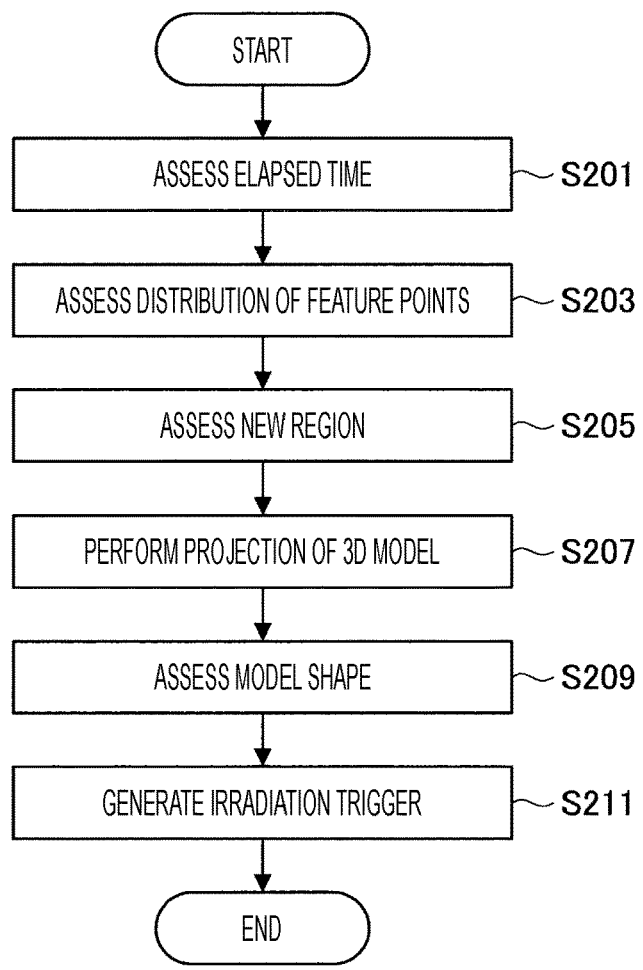
FIG. 5 is a flow chart showing an example of a procedure of a series of processing of an information processing system according to the embodiment.

Next, an example of a procedure of a series of processing of the information processing system 1 according to the present embodiment is described with reference to FIG. 4 and FIG. 5, with attention particularly on the processing of the information processing apparatus 100. FIG. 4 and FIG. 5 are flow charts showing an example of a procedure of a series of processing of the information processing system 1 according to the present embodiment.

As shown in FIG. 4, first, on the basis of matching between an image captured by the imaging unit 230 held to the mobile body 200 and a three-dimensional space model generated or updated in advance, the information processing apparatus 100 (the matching processing unit 123) calculates positions on the image corresponding to tracking points (S101). On the basis of the result of the matching, the information processing apparatus 100 (the attitude evaluation unit 124) estimates the position and attitude in the real space of the imaging unit 230 (in turn, the mobile body 200) (S103). Further, in this event, on the basis of the estimation result, the information processing apparatus 100 (the three-dimensional model updating unit 125) may amend (optimize) the three-dimensional positions of tracking points (that is, feature points) included in the three-dimensional space model (S105).

Note that the processing indicated by reference characters S103 to S105 may not be executed in a case where information regarding tracking points (that is, feature points) is not registered to a three-dimensional space model like immediately after startup etc. Note that, in this case, it is preferable that a trigger (an irradiation trigger) be activated in advance so that light is sent by the light sending unit 213.

Next, in a case where an irradiation trigger has been activated (S107: YES), light is sent from the light sending unit 213 of the depth sensor 210 toward a physical body in the real space (in other words, a detection region), and the light reflected at the physical body is detected by the detection unit 211 of the depth sensor 210. The information processing apparatus 100 (the depth estimation unit 110) estimates the distance between the mobile body 200 and the physical body located in the real space on the basis of information according to the result of detection by the depth sensor 210, and generates a depth map in which the result of estimation of the distance is mapped on an imaging plane. Further, the information processing apparatus 100 (the corner point detection unit 121) performs image analysis processing on an image captured by the imaging unit 230 (that is, an image of the real space) to extract texture information from the image, and detects corner points from the image on the basis of the extracted texture information (S109).

The information processing apparatus 100 (the feature point extraction unit 122) performs, for each of the detected corner points, the extraction of information indicating the result of measurement of the corresponding distance (in other words, depth information) from the acquired depth map and the association with the depth information, and thereby prescribes feature points having three-dimensional position information (S111). In the above way, feature points are extracted from the image captured by the imaging unit 230. Then, the information processing apparatus 100 (the three-dimensional model updating unit 125) unifies the extracted feature points into a three-dimensional space model (S113).

Note that the processing indicated by reference characters S109 to S113 may not be executed in a case where an irradiation trigger is not activated (S107: NO).

Next, the information processing apparatus 100 (the assessment unit 130) assesses conditions according to a prescribed situation related to the estimation of the position and attitude in the real space of the mobile body 200, and generates an irradiation trigger in accordance with the assessment result (S200).

Here, a more specific example of the processing indicated by reference character S200 is described with reference to FIG. 5.

As shown in FIG. 5, the information processing apparatus 100 (the elapsed time assessment unit 131) may monitor the elapsed time (for example, the number of frames) from when the light sending unit 213 of the depth sensor 210 started or ended the sending of light, and may assess whether the elapsed time has exceeded a prescribed period or not (S201).

The information processing apparatus 100 (the feature point distribution assessment unit 135) may assess the status of the tracking of the position and attitude in the real space of the mobile body 200 on the basis of the result of matching between an image captured by the imaging unit 230 and a three-dimensional space model. As a specific example, the information processing apparatus 100 may assess whether the number of successfully tracked feature points has become less than a threshold or not. Further, as another example, the information processing apparatus 100 may evaluate the distribution of successfully tracked feature points, and may specify a partial region where the number of such feature points is less than a threshold in a case where unevenness has occurred in the distribution of successfully tracked feature points (S203).

The information processing apparatus 100 (the new region/new visual point assessment unit 137) may assess whether feature points are extracted for a new region or not and whether a new visual point is detected or not on the basis of the result of updating of a three-dimensional space model (S205).

Further, the information processing apparatus 100 (the prediction unit 126) extracts the depth information of feature points that are predicted to be observed in accordance with the current position and attitude of the mobile body 200, as the result of prediction of the depth information, with reference to a three-dimensional space model and in accordance with a distribution of feature points extracted in the past (S207). Further, the information processing apparatus 100 (the model shape assessment unit 133) compares a depth map generated in accordance with the current position and attitude of the mobile body 200 (that is, the result of actual observation of the depth information of feature points) and the result of prediction of the depth information of feature points that are predicted to be observed. Thereby, the information processing apparatus 100 may assess whether the gap between the result of actual observation of the depth information of feature points and the result of prediction of the depth information of the feature points has exceeded a threshold or not (S209)

Then, the information processing apparatus 100 (the trigger generation unit 140) generates an irradiation trigger in accordance with the various assessment results described above, and writes the generated irradiation trigger on the control memory 190; thereby, controls operation related to the sending of light by the light sending unit 213 (S211).

Hereinabove, an example of a procedure of a series of processing of the information processing system 1 according to the present embodiment is described with reference to FIG. 4 and FIG. 5, with attention particularly on the processing of the information processing apparatus 100.

3.3. Example

Next, Example of the information processing system 1 according to the present embodiment is described.

As described above, in the information processing system 1 according to the present embodiment, the information processing apparatus 100 controls operation related to the sending of light by the light sending unit 213 in accordance with a prescribed situation related to the estimation of the position and attitude in the real space of a target apparatus (for example, the mobile body 200). On the basis of such a configuration, for example, the information processing apparatus 100 controls the range in which light is sent by the light sending unit 213 (that is, the irradiation range) in accordance with the situation, and can thereby limit the amount of light sent. Further, the information processing apparatus 100 can limit opportunities when light is sent from the light sending unit 213 in accordance with the situation. Thereby, in the information processing system 1 according to the present embodiment, the power consumption of the depth sensor 210 can be suppressed to a low level. Thus, in the present Example, an example of relationship between the control of operation related to the sending of light by the light sending unit 213 and the power consumption of the depth sensor 210 is described below using specific examples.

First, a relationship between the range in which the depth sensor 210 can acquire depth information (that is, the distance measurement range of the depth sensor 210) and power consumption is described. The distance measurement range of the depth sensor 210 depends on the irradiation power of light sent by the light sending unit 213. Specifically, in a case where the amount of error in distance measurement is denoted by $\sigma_L$, the amount of error $\sigma_L$ is expressed by the relation shown as Formula 1 below.

[Math. 1]

$$\sigma = (k/p) \cdot (1 + N/p)^{(1/2)} \quad \text{(Formula 1)}$$

p: The amount of electrons corresponding to irradiation power (quantity of electron)
k: A constant depending on the wavelength of irradiation light (Pulse property)
N: The estimated value of noise elements (Noise)

In Formula 1 above, the variable p corresponds to the amount of electrons of light sent from the light sending unit 213. Further, the amount of electrons depends on the irradiation power of light sent by the light sending unit 213. From these facts, it can be seen that the amount of error a in distance measurement depends on the irradiation power of light sent by the light sending unit 213.

Figure 6:
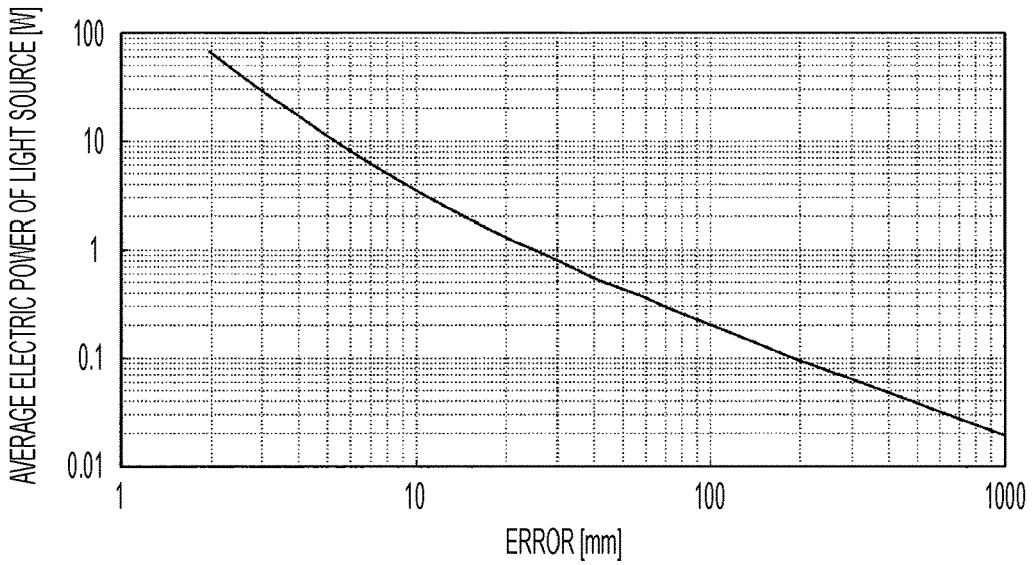
FIG. 6 is a diagram showing an example of simulation result regarding relationship between the average sundry expenses electric power of a light sending unit and error in distance measurement.

Further, FIG. 6 is a diagram showing an example of simulation result regarding relationship between the average sundry expenses electric power of the light sending unit 213 and error in distance measurement. In FIG. 6, the horizontal axis represents error (mm) in distance measurement, and the vertical axis represents the average electric power (w) of the light source (that is, the light sending unit 213).

As shown in FIG. 6, the higher the average power consumption of the light source is, the smaller the error occurring in distance measurement tends to be. Further, the shorter the pulse width of light sent from the light source is (that is, the shorter the interval of intermittent driving is), the smaller the error occurring in distance measurement tends to be.

Further, in a case where the amount of attenuation of light is denoted by P and the distance through which light propagates is denoted by d, the relation shown as Formula 2 below holds between the amount of attenuation P and the distance d.

[Math. 2]

$$P = \frac{1}{d^2} \quad \text{(Formula 2)}$$

That is, in general, the power consumption becomes four times larger when the distance measurement precision is set twice larger, and the power consumption becomes four times larger when the distance measurement range is set twice larger.

Figure 7:
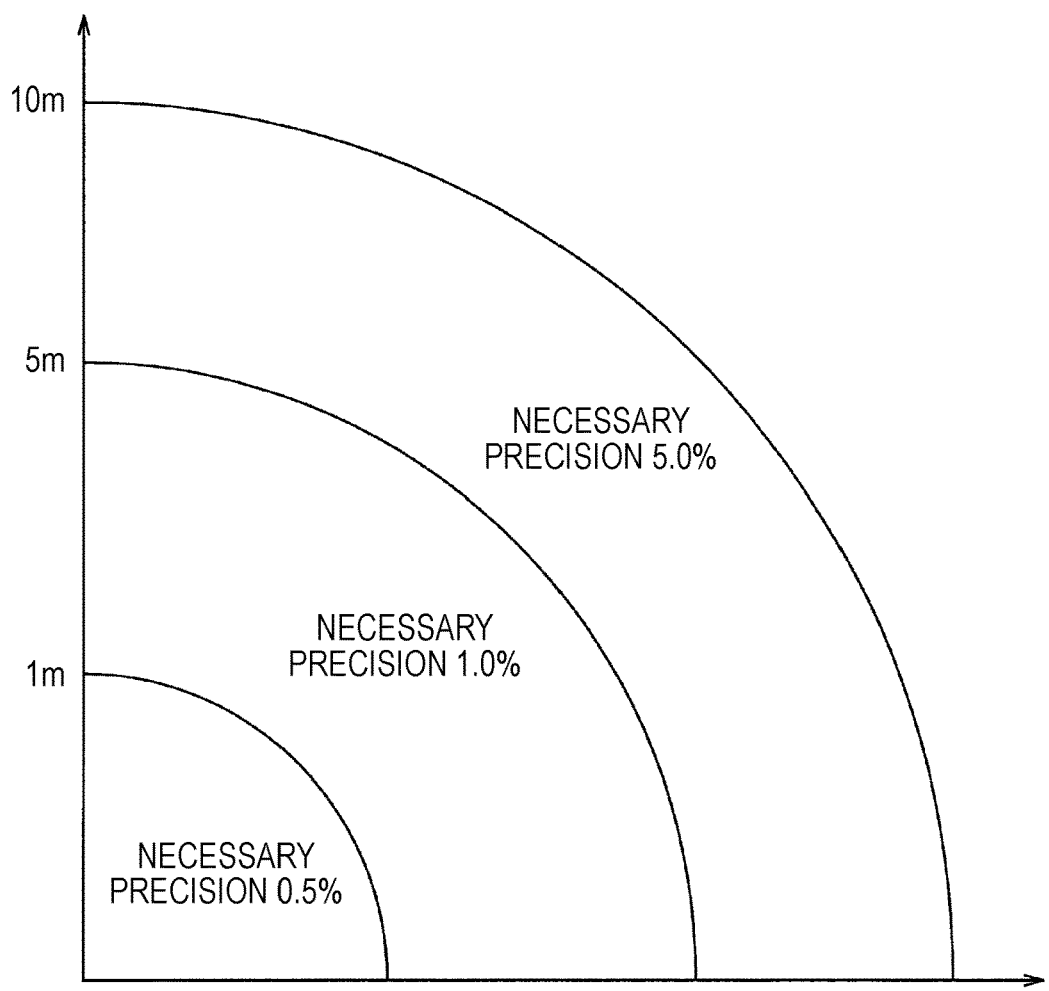
FIG. 7 is an explanatory diagram for describing an example of conditions required for distance measurement in accordance with the distance measurement range.

Here, an example of precision (that is, required specification) required for distance measurement in accordance with the distance measurement range (the distance) is described with reference to FIG. 7. FIG. 7 is an explanatory diagram for describing an example of conditions required for distance measurement in accordance with the distance measurement range. Note that, in the example shown in FIG. 7, also precisions required in cases where the distance measurement range is "1 m", "5 m", and "10 m" are shown.

As a specific example, in a case where the distance measurement range is 1 m, errors of less than or equal to 0.5% are required as precision. Further, as another example, in a case where the distance measurement range is 5 m, errors of less than or equal to 1.0, are required as precision. Further, as another example, in a case where the distance measurement range is 10 m, errors of less than or equal to 5.0% are required as precision.

Here, an example in a case where the technology according to the present disclosure is applied to a depth sensor that operates under the conditions mentioned below (hereinafter, also referred to as a "depth sensor according to the present Example") is summarized below with attention on a case where the depth sensor according to the present Example is adapted to each of the use cases shown in FIG. 7.

Irradiation angle in the horizontal direction: 55 degs
Error: less than or equal to 1% in a distance measurement range of 5 m
Power consumption: 2500 mW (in a case where the distance measurement range is 5 m and the error is less than or equal to 1%)

For example, the estimated amounts of power consumption in cases where the irradiation power of light sent by the depth sensor according to the present Example is controlled in accordance with the required specifications shown in FIG. 7 are as shown as Table 1 below. That is, in the example shown in Table 1, at least 400 mW is needed as power consumption.

TABLE 1

Estimated amount of power consumption

| Required specifications | Power consumption (specification of depth sensor) | → | Power consumption (estimated amount) |
|---|---|---|---|
| Distance measurement range: 1 m Error: less than or equal to 0.5% | — | Distance: 0-2 times Precision: 2.0 times | 400 mW |
| Distance measurement range: 1 m Error: less than or equal to 1.0% | 2500 mW | Distance: 1.0 times Precision: 1.0 times | 2500 mW |
| Distance measurement range: 1 m Error: less than or equal to 5.0% | — | Distance: 2.0 times Precision: 0.2 times | 400 mW |

Here, the size of a target that is an object of distance measurement is assumed to be approximately 50 cm, and it is assumed that the irradiation angle of light sent from the light source of the depth sensor according to the present Example is limited from 55 degs to 10 degs.

Figure 8:
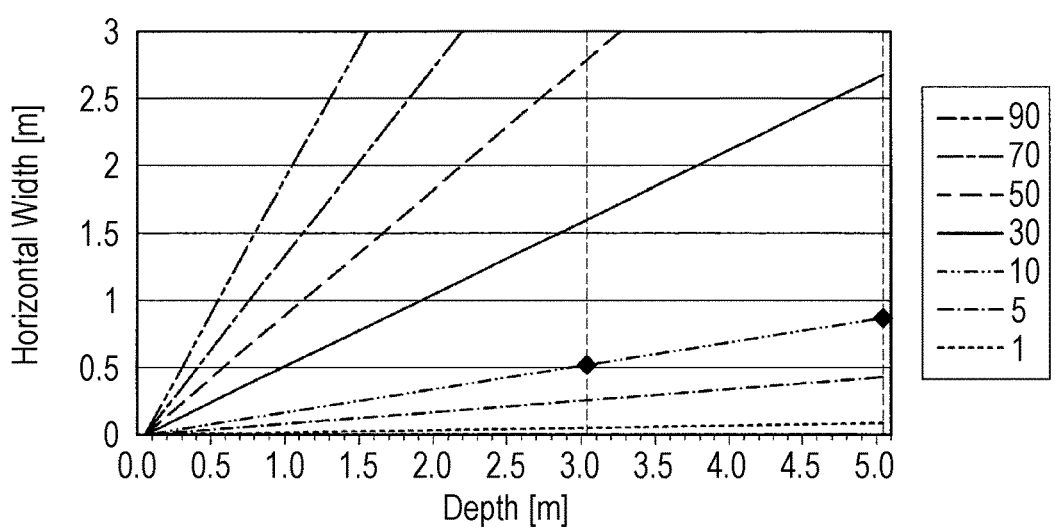
FIG. 8 is a diagram showing an example of relationship between the depth according to the irradiation angle of light and the irradiation range in the horizontal direction.

For example, FIG. 8 is a diagram showing an example of relationship between the depth according to the irradiation angle of light and the irradiation range in the horizontal direction. In FIG. 8, the horizontal axis represents the depth (m), and the vertical axis represents the irradiation range (m) in the horizontal direction. Note that, in the example shown in FIG. 8, relationships between the depth according to the irradiation angle and the irradiation range in the horizontal direction are shown for cases where the irradiation angle of light is 1 deg, 5 degs, 10 degs, 30 degs, 50 degs, 70 degs, and 90 degs.

That is, in a case where the irradiation angle of light is limited from 55 degs to 10 degs, as shown in FIG. 8, 0.5 m can be ensured as the irradiation range in the horizontal direction at a point with a depth of 3 m, and 0.9 m can be ensured as the irradiation range in the horizontal direction at a point with a depth of 5 m.

Figure 9:
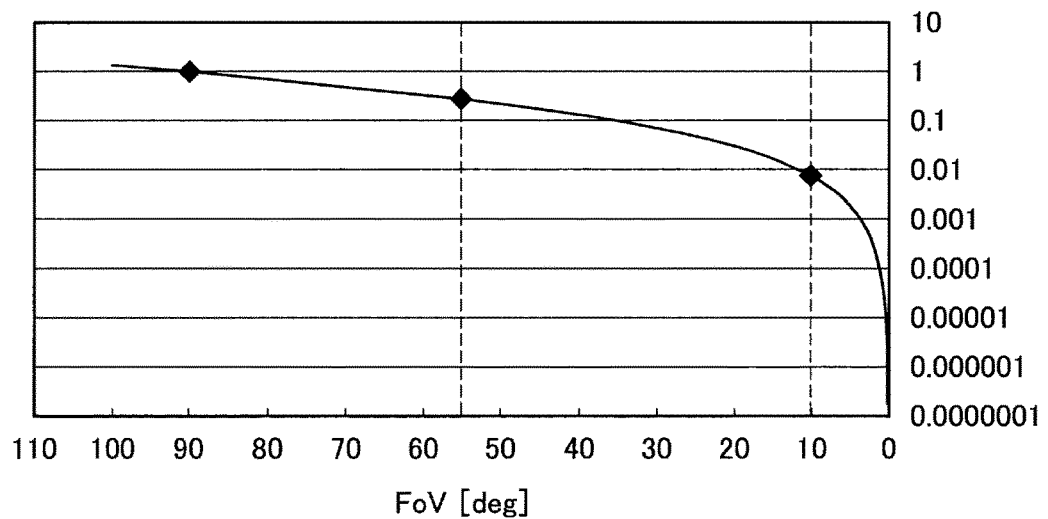
FIG. 9 is a diagram showing an example of relationship between the irradiation angle of light and power consumption.

Next, an example of change in power consumption in a case where the irradiation angle of light is limited is described with reference to FIG. 9. FIG. 9 is a diagram showing an example of relationship between the irradiation angle of light and power consumption, and shows an example of simulation result regarding relative changes in power consumption according to the irradiation angle in a case where the case of an irradiation angle of 90 degs is assumed to be 1. In FIG. 9, the horizontal axis represents the irradiation angle (degs), and the vertical axis represents power consumption in relative values.

As shown in FIG. 9, in a case where the irradiation angle of light is limited from 55 degs to 10 degs, it is expected that the power consumption can be limited to ⅓5. That is, in the example shown in Table 1, the power consumption can be limited as shown in Table 2 below by limiting the irradiation angle of light from 55 degs to 10 degs.

TABLE 2

| | Estimated amount of power consumption | | |
|---|---|---|---|
| Required specifications | Power consumption (specification of depth sensor) | → | Power consumption (estimated amount) |
| Distance measurement range: 1 m Error: less than or equal to 0.5% | — | Distance: 0.2 times Precision: 2.0 times | 400 mW → 11.4 mW |
| Distance measurement range: 1 m Error: less than or equal to 1.0% | 2500 mW | Distance: 1.0 times Precision: 1.0 times | 2500 mW → 71.4 mW |
| Distance measurement range: 1 m Error: less than or equal to 5.0% | — | Distance: 2.0 times Precision: 0.2 times | 400 mW → 11.4 mW |

In the example shown in Table 2 above, for example, in a case where the required specification in terms of electric power is assumed to be 200 mW, it can be seen that the electric power is made well below the required specification by the control of the irradiation angle (that is, the limit of projection toward a space). Thus, in the information processing system 1 according to an embodiment of the present disclosure, power consumption can be suppressed while distance measurement precision is maintained by, for example, limiting the irradiation angle (irradiation range) of light sent from the light source of the depth sensor in accordance with the situation.

Hereinabove, Example of the information processing system 1 according to the present embodiment is described with reference to FIG. 6 to FIG. 9.

3.4. Modification Examples

Next, examples in cases where the region to which light is sent from the light sending unit 213 of the depth sensor 210 is limited in accordance with the result of detection of a prescribed target object are described as modification examples of the information processing system 1 according to the present embodiment.

For example, by detecting a part such as a face, a hand, or a foot, a person oneself, etc. as a target object, the information processing apparatus 100 may control the irradiation direction and the irradiation range of light such that light is sent from the light sending unit 213 toward a region where the target object is detected.

As a specific example, the information processing apparatus 100 may perform image analysis on an image captured by the imaging unit 230 to detect a prescribed target object from the image, and may set, as an ROI, a part of the image where the target object is detected. In this case, the information processing apparatus 100 may control the irradiation direction and the irradiation range of light such that light is partially sent from the light sending unit 213 toward a region in the real space corresponding to the ROI.

Figure 10:
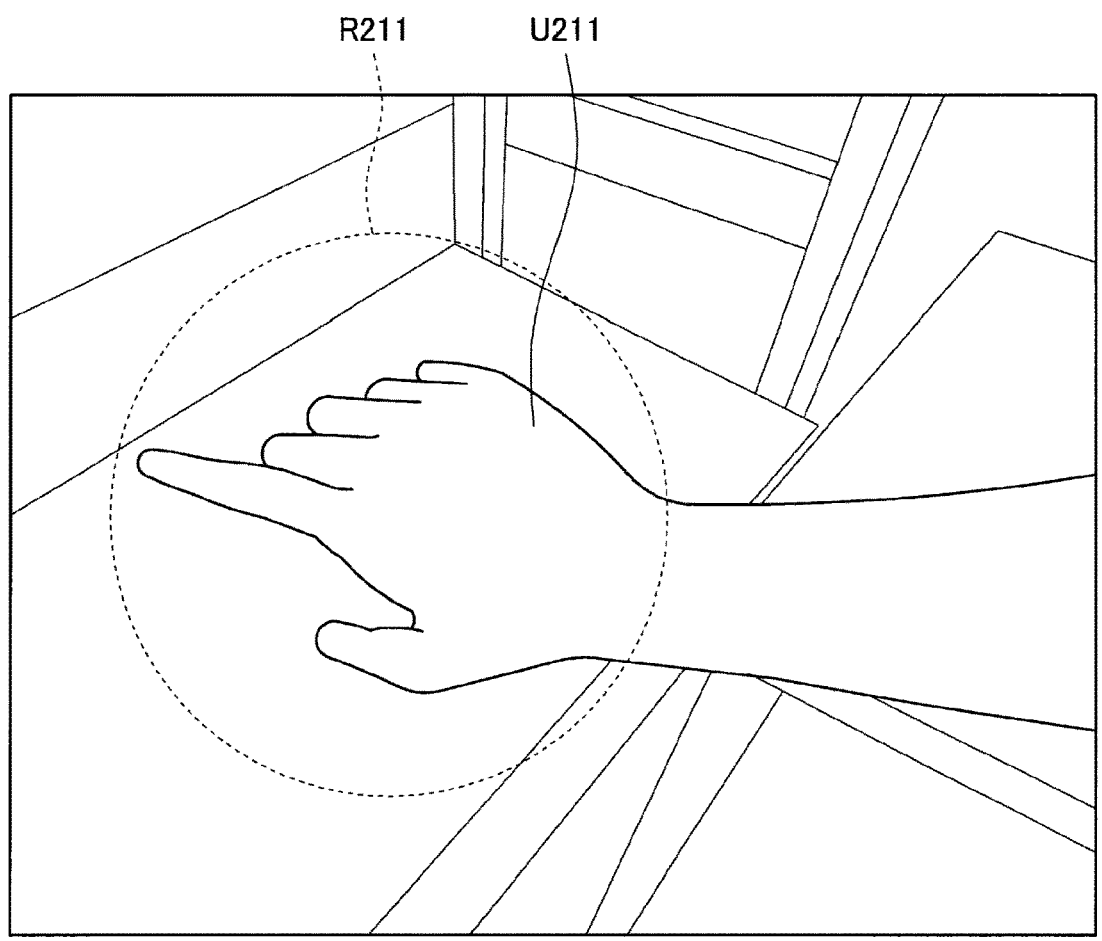
FIG. 10 is an explanatory diagram for describing an overview of an information processing system according to a modification example.
Figure 11:
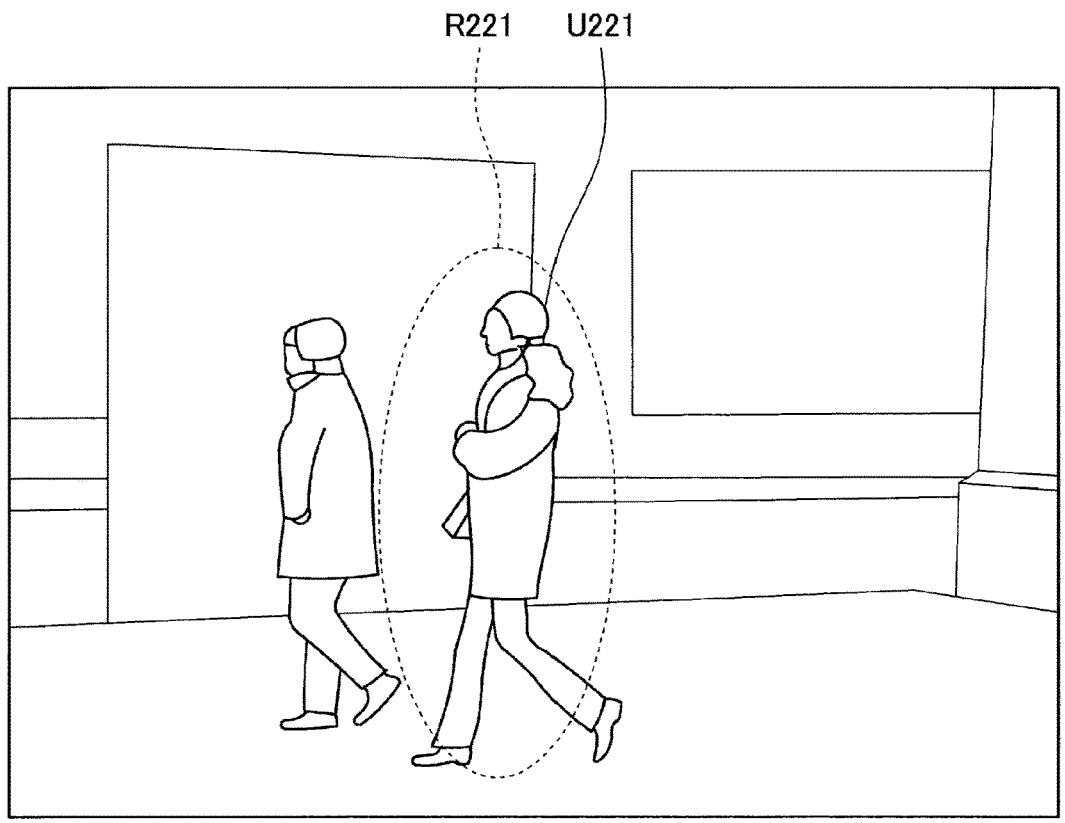
FIG. 11 is an explanatory diagram for describing an overview of an information processing system according to a modification example.
Figure 12:
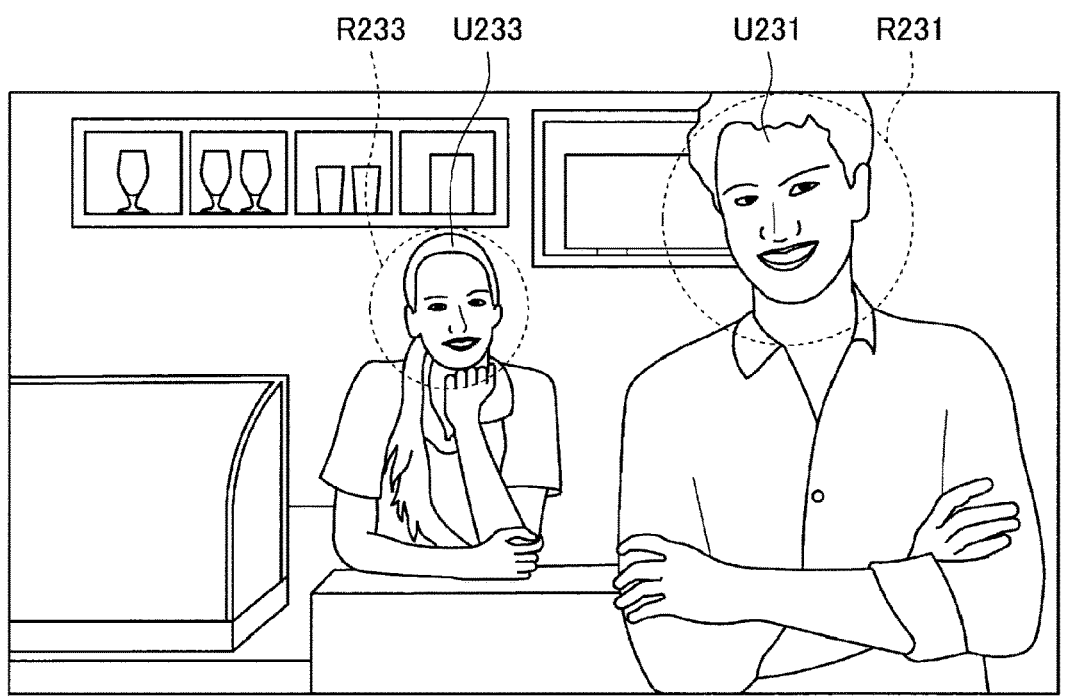
FIG. 12 is an explanatory diagram for describing an overview of an information processing system according to a modification example.

For example, FIG. 10 to FIG. 12 are explanatory diagrams for describing overviews of information processing systems according to modification examples, and show examples in cases where the irradiation range of light sent from the light sending unit 213 is limited.

Specifically, FIG. 10 shows an example in a case where a hand of a user is detected as a target object. In this case, the information processing apparatus 100 may set, as an ROI, a region where a hand U211 of the user is detected, and may control the irradiation direction and the irradiation range of light such that light is partially sent from the light sending unit 213 toward partial region R211 in the real space corresponding to the ROI.

Further, FIG. 11 shows an example in a case where a person (that is, the whole picture of a human being) is detected as a target object. In this case, the information processing apparatus 100 may set, as an ROI, a region where a person U221 is detected, and may control the irradiation direction and the irradiation range of light such that light is partially sent from the light sending unit 213 toward partial region R221 in the real space corresponding to the ROI.

Further, FIG. 12 shows an example in a case where the faces of users are detected as target objects. Note that the example shown in FIG. 12 shows an example in a case where a plurality of target objects (that is, the faces of users) is detected. Specifically, in the example shown in FIG. 12, the faces U231 and U233 of two users are detected. In such a case, the information processing apparatus 100 may individually set, as ROIs, regions where the faces U231 and U233 are detected, and may control the irradiation directions and the irradiation ranges of lights such that lights are individually sent from the light sending unit 213 toward partial regions (that is, partial regions R231 and R233) in the real space corresponding to the ROIs.

Note that, in a case where, as shown in FIG. 12, adaptation to a situation where lights are individually sent to a plurality of partial regions as objects is envisaged, a plurality of light sources arranged on an array, for example, may be provided as the light sending unit 213. In this case, the information processing apparatus 100 is only required to, for example, individually control the irradiation directions and the irradiation ranges of lights sent from the light sources to make control such that lights are individually sent toward partial regions R231 and R233 corresponding to the ROIs.

Further, as another example, a plurality of movable mirrors using MEMS technology may be used to separate light sent from the light sending unit 213, and thereby control may be made such that lights are individually sent toward partial regions R231 and R233 corresponding to the ROIs. Note that the movable mirrors may be provided in the interior of the light sending unit 213.

Hereinabove, examples in cases where the region to which light is sent from the light sending unit 213 of the depth sensor 210 is limited in accordance with the result of detection of a prescribed target object are described with reference to FIG. 10 to FIG. 12 as modification examples of the information processing system 1 according to the present embodiment.

4. Hardware Configuration

Figure 13:
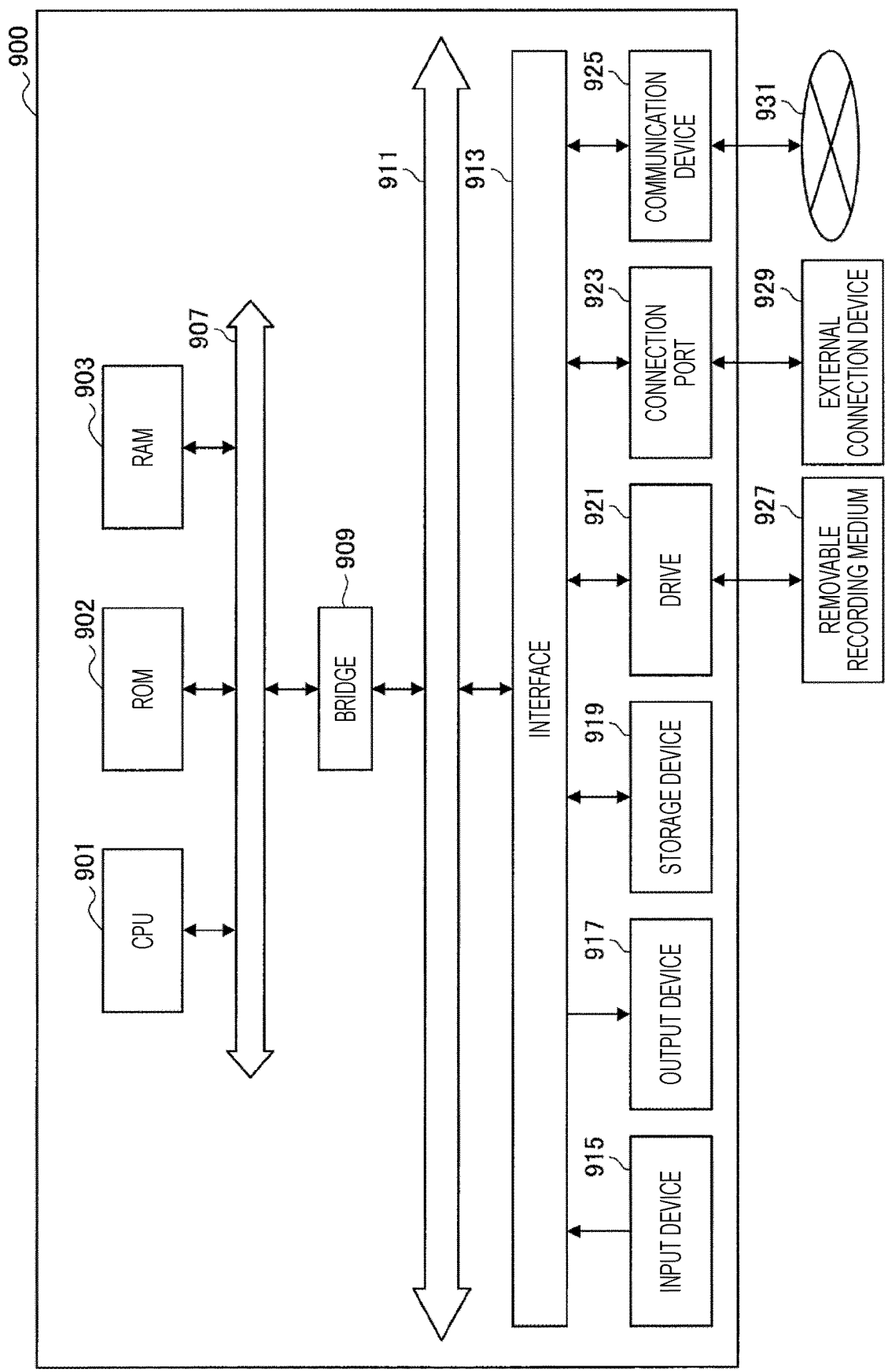
FIG. 13 is a functional block diagram showing a configuration example of a hardware configuration of an information processing apparatus included in an information processing system according to an embodiment of the present disclosure.

Next, like the information processing apparatus 100 described above, a hardware configuration of an information processing apparatus included in the information processing system according to an embodiment of the present disclosure will be described in detail with reference to FIG. 13. FIG. 13 is a function block diagram illustrating a configuration example of the hardware configuration of the information processing apparatus included in the information processing system according to an embodiment of the present disclosure.

The information processing apparatus 900 included in the information processing system according to the present embodiment mainly includes a CPU 901, a ROM 902, and a RAM 903. Furthermore, the information processing apparatus 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing apparatus 900 according to various programs recorded in the ROM 902, the RAM 903, the storage device 919, or a removable recording medium 927. The ROM 902 stores programs, operation parameters, and the like used by the CPU 901. The RAM 903 primarily stores programs that the CPU 901 uses and parameters and the like varying as appropriate during the execution of the programs. These are connected with each other via the host bus 907 including an internal bus such as a CPU bus. For example, each of the depth estimation unit 110, the self-position estimation unit 120, the assessment unit 130, and the trigger generation unit 140 shown in FIG. 2 may include the CPU 901.

The host bus 907 is connected to the external bus 911 such as a peripheral component interconnect/interface (PCI) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal, for example. Also, the input device 915 may be a remote control mechanism (a so-called remote control) using, for example, infrared light or other radio waves, or may be an external connection device 929 such as a mobile phone or a PDA conforming to the operation of the information processing apparatus 900. Furthermore, the input device 915 generates an input signal based on, for example, information which is input by a user with the above operation mechanism, and includes an input control circuit for outputting the input signal to the CPU 901, and the like. The user of the information processing apparatus 900 can input various data to the information processing apparatus 900 and can instruct the information processing apparatus 900 to perform processing by operating the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing apparatus 900. More specifically, the display device displays, in the form of texts or images, a result obtained by various processes performed by the information processing apparatus 900. On the other hand, the audio output device converts an audio signal including reproduced audio data, sound data, and the like into an analog signal, and outputs the analog signal.

The storage device 919 is a device for storing data configured as an example of a storage unit of the information processing apparatus 900. The storage device 919 includes, for example, a magnetic storage device such as a hard disk drive (HDD), a semiconductor storage device, an optical storage device, a magneto-optical storage device, or the like. This storage device 919 stores programs to be executed by the CPU 901, various data, and the like. For example, the storage unit 180 and the control memory 190 illustrated in FIG. 3 may include the storage device 919.

The drive 921 is a reader/writer for recording medium, and is embedded in the information processing apparatus 900 or attached externally thereto. The drive 921 reads information recorded in the attached removable recording medium 927 such as a magnetic disk, an optical disc, a magneto-optical disk, or a semiconductor memory, and outputs the read information to the RAM 903. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, a Blu-ray (registered trademark) medium, or the like. In addition, the removable recording medium 927 may be a CompactFlash (CF) (registered trademark), a flash memory, a secure digital memory card (SD memory card), or the like. Alternatively, the removable recording medium 927 may be, for example, an integrated circuit card (IC card) equipped with a non-contact IC chip, an electronic appliance, or the like.

The connection port 923 is a port for allowing devices to directly connect to the information processing apparatus 900. Examples of the connection port 923 include a universal serial bus (USB) port, an IEEE1394 port, a small computer system interface (SCSI) port, and the like. Other examples of the connection port 923 include an RS-232C port, an optical audio terminal, a high-definition multimedia interface (HDMI) (registered trademark) port, and the like. By the external connection device 929 connecting to this connection port 923, the information processing apparatus 900 directly obtains various types of data from the external connection device 929 and provides various types of data to the external connection device 929.

The communication device 925 is a communication interface including, for example, a communication device for connecting to a communication network 931, and the like. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber Line (ADSL), a modem for various communications, or the like. This communication device 925 can transmit and receive signals and the like in accordance with a predetermined protocol such as TCP/IP on the Internet and with other communication devices, for example. In addition, the communication network 931 connected to the communication device 925 includes a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 900 included in the information processing system according to the embodiment of the present disclosure has been shown. Each of the components described above may be configured using a general-purpose material, or may be implemented by hardware dedicated to the function of each component. Accordingly, the hardware configuration to be used can be changed as appropriate according to the technical level at the time of carrying out the present embodiment. Note that, although not shown in FIG. 13, for example, it naturally includes various configurations corresponding to the information processing apparatus 900 included in the information processing system.

Note that it is also possible to develop a computer program for realizing the respective functions of the information processing apparatus 900 included in the information processing system according to the present embodiment as discussed above, and implement the computer program in a personal computer or the like. In addition, a computer-readable recording medium storing such a computer program may also be provided. The recording medium may be, for example, a magnetic disk, an optical disc, a magneto-optical disk, flash memory, or the like. Furthermore, the above computer program may also be delivered via a network, for example, without using a recording medium. In addition, the number of computers causing the computer program to be executed is not particularly limited. For example, the computer program may be executed in cooperation of a plurality of computers (e.g., a plurality of servers or the like).

5. Conclusions

As described hereinabove, in the information processing system 1 according to the present embodiment, the information processing apparatus 100 estimates the distance between a prescribed visual point (in other words, the mobile body 200 shown in FIG. 1) and a physical body on the basis of the result of detection of light that is sent from a prescribed light sending unit 213 toward the physical body in the real space and is reflected at the physical body. Further, on the basis of the result of estimation of the distance, the information processing apparatus 100 estimates at least either one of the position or attitude in the real space of the prescribed visual point. Then, the information processing apparatus 100 controls light sent from the light sending unit 213 mentioned above in accordance with a situation regarding the estimation of at least either one of the position or attitude of the prescribed visual point mentioned above. As a specific example, the information processing apparatus 100 may limit the period during which light is sent from the light sending unit 213 in accordance with the situation. Further, as another example, the information processing apparatus 100 may limit the irradiation range of light sent from the light sending unit 213 in accordance with the situation.

By a configuration like the above, in the information processing system 1 according to the present embodiment, power consumption can be reduced more while precision for the estimation of the distance to a target physical body is maintained even in a case where the active irradiation system is employed for the estimation. That is, by the information processing system according to the present embodiment, both the stabilization of estimation of the distance to a target physical body and the suppression of power consumption can be achieved in a case where the active irradiation system is employed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)

An information processing apparatus including:

a first estimation unit configured to estimate a distance between a prescribed visual point and a physical body in a real space on the basis of result of detection of light that is sent from a prescribed light sending unit toward the physical body and is reflected at the physical body;

a second estimation unit configured to estimate at least either one of a position or an attitude in the real space of the prescribed visual point on the basis of result of estimation of the distance; and a control unit configured to control the light sent from the light sending unit in accordance with a situation regarding estimation of at least either one of the position or the attitude.

(2)

The information processing apparatus according to (1), in which the control unit limits a period during which the light is sent from the light sending unit in accordance with the situation.

(3)

The information processing apparatus according to (2), in which the control unit limits the period during which the light is sent by making control such that the light is intermittently sent from the light sending unit.

(4)

The information processing apparatus according to (1) to (3), in which the control unit limits an irradiation range of the light sent from the light sending unit in accordance with the situation.

(5)

The information processing apparatus according to any one of (1) to (4), in which the second estimation unit estimates at least either one of the position or the attitude in the real space of the prescribed visual point on the basis of an image captured by an imaging unit held to the prescribed visual point and the result of estimation of the distance.

(6)

The information processing apparatus according to (5), in which the second estimation unit extracts a feature point from the image and estimates at least either one of the position or the attitude on the basis of result of extraction of the feature point, and the control unit controls the light sent from the light sending unit in accordance with the result of extraction of the feature point.

(7)

The information processing apparatus according to (6), in which the control unit makes control such that the light is sent from the light sending unit in a case where the number of feature points that are tracked in accordance with change of at least either one of the position or the attitude has become less than a threshold.

(8)

The information processing apparatus according to (6), in which the control unit limits an irradiation range of the light such that the light is sent from the light sending unit to, as an object, at least a partial region where the number of feature points tracked has become less than a threshold, out of a region of which the image is captured by the imaging unit.

(9)

The information processing apparatus according to any one of (6) to (8), in which the second estimation unit generates or updates a three-dimensional space model in which an environment around the prescribed visual point is three-dimensionally reconstructed on the basis of the result of extraction of the feature point, and estimates at least either one of the position or the attitude on the basis of the feature point newly extracted from the image and the three-dimensional space model generated or updated in the past, and the control unit controls the light sent from the light sending unit on the basis of the feature point newly extracted from the image and the three-dimensional space model generated or updated in the past.

(10)

The information processing apparatus according to (9), in which the control unit makes control such that the light is sent from the light sending unit in a case where information corresponding to the feature point extracted from the newly captured image is not included in the three-dimensional space model generated or updated in the past.

(11)

The information processing apparatus according to (9), in which the control unit controls the light sent from the light sending unit on the basis of result of comparison between at least either one of the current position or the current attitude of the prescribed visual point estimated on the basis of the newly captured image, and at least either one of the position or the attitude that is based on the three-dimensional space model and that has been estimated in the past for the prescribed visual point.

(12)

The information processing apparatus according to (9), in which the control unit makes control such that the light is sent from the light sending unit in a case where a difference between result of estimation of a position in the real space of the feature point extracted from the newly captured image and result of prediction of a position in the real space of the feature point according to the three-dimensional space model generated or updated in the past is more than or equal to a threshold.

(13)

The information processing apparatus according to any one of (5) to (12), in which the control unit limits an irradiation range of the light such that the light is sent toward a prescribed target object in a case where the target object is captured as the physical body in the image.

(14)

The information processing apparatus according any one of (5) to (13), in which the light sending unit and the imaging unit are held by a prescribed casing, and the second estimation unit estimates at least either one of a position or an attitude in the real space of the casing.

(15)

The information processing apparatus according to any one of (5) to (14), in which the first estimation unit estimates the distance on the basis of result of imaging of the light by the imaging unit.

(16)

The information processing apparatus according to any one of (5) to (15), in which, in a case where there are a plurality of light sending units, the control unit controls timing of sending of the light by each of the plurality of light sending units such that the light is sent in a time division manner from each of the plurality of light sending units.

(17)

An information processing method, in which a computer performs estimating a distance between a prescribed visual point and a physical body in a real space on the basis of result of detection of light that is sent from a prescribed light sending unit toward the physical body and is reflected at the physical body, estimating at least either one of a position or an attitude in the real space of a prescribed visual point on the basis of result of estimation of the distance, and controlling the light sent from the light sending unit in accordance with a situation regarding estimation of at least either one of the position or the attitude.

(18)

A program for causing a computer to execute the processing of:

estimating a distance between a prescribed visual point and a physical body in a real space on the basis of result of detection of light that is sent from a prescribed light sending unit toward the physical body and is reflected at the physical body;

estimating at least either one of a position or an attitude in the real space of a prescribed visual point on the basis of result of estimation of the distance; and controlling the light sent from the light sending unit in accordance with a situation regarding estimation of at least either one of the position or the attitude.

REFERENCE SIGNS LIST

1 Information processing system
100 Information processing apparatus
110 Depth estimation unit
120 Self-position estimation unit
121 Corner point detection unit
122 Feature point extraction unit
123 Matching processing unit
124 Attitude evaluation unit
125 Dimensional model updating unit
126 Prediction unit
130 Assessment unit
131 Elapsed time assessment unit
133 Model shape assessment unit
135 Feature point distribution assessment unit
137 New region/new visual point assessment unit
140 Trigger generation unit
180 Storage unit
190 Control memory
200 Mobile body
210 Depth sensor
211 Detection unit
213 Light sending unit
230 Imaging unit

The invention claimed is:

1. An information processing apparatus comprising:
a first estimation unit configured to estimate a distance between a prescribed visual point and a physical body in a real space on a basis of a result of detection of light that is sent from a prescribed light sending unit toward the physical body and is reflected by the physical body;
a second estimation unit configured to estimate at least either one of a position or an attitude in the real space of the prescribed visual point on a basis of a result of estimation of the distance; and
a control unit configured to control the light sent from the light sending unit in accordance with a situation regarding estimation of at least either one of the position or the attitude,
wherein the situation regarding the estimation of the at least either one of the position or the attitude includes information corresponding to at least one feature point,
wherein the second estimation unit is configured to estimate the at least either one of the position or the attitude in the real space of the prescribed visual point on a basis of an image captured by an imaging unit held to the prescribed visual point and the result of estimation of the distance,
wherein the second estimation unit is further configured to extract the at least one feature point from the image, and the second estimation unit estimates the at least either one of the position or the attitude on a basis of a result of extraction of the at least one feature point,
wherein the control unit controls the light sent from the light sending unit in accordance with the result of extraction of the at least one feature point,
wherein the second estimation unit is further configured to generate or update a three-dimensional space model in which an environment around the prescribed visual point is three-dimensionally reconstructed on a basis of the result of extraction of the at least one feature point, and
estimate at least either one of the position or the attitude on a basis of the at least one feature point newly extracted from the image and the three-dimensional space model generated or updated in the past,
wherein the control unit further controls the light sent from the light sending unit on a basis of the at least one feature point newly extracted from the image and the three-dimensional space model generated or updated in the past,
wherein the control unit makes control such that the light is sent from the light sending unit in a case where the information corresponding to the at least one feature point extracted from a newly captured image is not included in the three-dimensional space model generated or updated in the past, and
wherein the first estimation unit, the second estimation unit, and the control unit are each implemented via at least one processor.

2. The information processing apparatus according to claim 1, wherein the control unit is further configured to limit a period during which the light is sent from the light sending unit in accordance with the situation.

3. The information processing apparatus according to claim 2, wherein the control unit limits the period during which the light is sent by making control such that the light is intermittently sent from the light sending unit.

4. The information processing apparatus according to claim 1, wherein the control unit is further configured to limit an irradiation range of the light sent from the light sending unit in accordance with the situation.

5. The information processing apparatus according to claim 1, wherein the control unit makes control such that the light is sent from the light sending unit in a case where a number of feature points that are tracked in accordance with change of at least either one of the position or the attitude has become less than a threshold.

6. The information processing apparatus according to claim 1, wherein the control unit is further configured to limit an irradiation range of the light such that the light is sent from the light sending unit to at least a partial region of an object where a number of feature points tracked has become less than a threshold, out of a region of the image which is captured by the imaging unit.

7. The information processing apparatus according to claim 1,
wherein the control unit controls the light sent from the light sending unit on a basis of a result of comparison between at least either one of a current position or a current attitude of the prescribed visual point estimated on a basis of the newly captured image, and at least either one of the position or the attitude that is based on the three-dimensional space model and that has been estimated in the past for the prescribed visual point.

8. The information processing apparatus according to claim 1, wherein the control unit makes control such that the light is sent from the light sending unit in a case where a difference between a result of estimation of a position in the real space of the at least one feature point extracted from the newly captured image and a result of prediction of a position in the real space of the at least one feature point according to the three-dimensional space model generated or updated in the past is more than or equal to a threshold.

9. The information processing apparatus according to claim 1, wherein the control unit is further configured to limit an irradiation range of the light such that the light is sent toward a prescribed target object in a case where the target object is captured as the physical body in the image.

10. The information processing apparatus according to claim 1,
wherein the light sending unit and the imaging unit are held by a prescribed casing, and
the second estimation unit estimates at least either one of a position or an attitude in the real space of the casing.

11. The information processing apparatus according to claim 1, wherein the first estimation unit estimates the distance on a basis of a result of imaging of the light by the imaging unit.

12. The information processing apparatus according to claim 1, wherein, in a case where there are a plurality of light sending units, the control unit controls timing of sending of the light by each of the plurality of light sending units such that the light is sent in a time division manner from each of the plurality of light sending units.

13. An information processing method executed by a computer, the information processing method comprising:
estimating a distance between a prescribed visual point and a physical body in a real space on a basis of result of detection of light that is sent from a prescribed light sending unit toward the physical body and is reflected by the physical body;
estimating at least either one of a position or an attitude in the real space of a prescribed visual point on a basis of result of estimation of the distance; and
controlling the light sent from the light sending unit in accordance with a situation regarding estimation of at least either one of the position or the attitude,
wherein the situation regarding the estimation of the at least either one of the position or the attitude includes information corresponding to at least one feature point,
wherein the at least either one of the position or the attitude in the real space of the prescribed visual point is estimated on a basis of an image captured by an imaging unit held to the prescribed visual point and the result of estimation of the distance,
wherein the at least one feature point is extracted from the image, and the at least either one of the position or the attitude is estimated on a basis of a result of extraction of the at least one feature point,
wherein the light sent from the light sending unit is controlled in accordance with the result of extraction of the at least one feature point, wherein the method further comprises
generating or updating a three-dimensional space model in which an environment around the prescribed visual point is three-dimensionally reconstructed on a basis of the result of extraction of the at least one feature point, and
estimating at least either one of the position or the attitude on a basis of the at least one feature point newly extracted from the image and the three-dimensional space model generated or updated in the past,
wherein the light sent from the light sending unit is further controlled on a basis of the at least one feature point newly extracted from the image and the three-dimensional space model generated or updated in the past, and
wherein the control causes the light to be sent from the light sending unit in a case where the information corresponding to the at least one feature point extracted from a newly captured image is not included in the three-dimensional space model generated or updated in the past.

14. A non-transitory computer-readable storage medium having embodied thereon a program, which when executed by a computer causes the computer to execute a method, the method comprising:
estimating a distance between a prescribed visual point and a physical body in a real space on a basis of result of detection of light that is sent from a prescribed light sending unit toward the physical body and is reflected by the physical body;
estimating at least either one of a position or an attitude in the real space of a prescribed visual point on a basis of result of estimation of the distance; and
controlling the light sent from the light sending unit in accordance with a situation regarding estimation of at least either one of the position or the attitude,
wherein the situation regarding the estimation of the at least either one of the position or the attitude includes information corresponding to at least one feature point,
wherein the at least either one of the position or the attitude in the real space of the prescribed visual point is estimated on a basis of an image captured by an imaging unit held to the prescribed visual point and the result of estimation of the distance,
wherein the at least one feature point is extracted from the image, and the at least either one of the position or the attitude is estimated on a basis of a result of extraction of the at least one feature point,
wherein the light sent from the light sending unit is controlled in accordance with the result of extraction of the at least one feature point,
wherein the method further comprises
generating or updating a three-dimensional space model in which an environment around the prescribed visual point is three-dimensionally reconstructed on a basis of the result of extraction of the at least one feature point, and
estimating at least either one of the position or the attitude on a basis of the at least one feature point newly extracted from the image and the three-dimensional space model generated or updated in the past,
wherein the light sent from the light sending unit is further controlled on a basis of the at least one feature point newly extracted from the image and the three-dimensional space model generated or updated in the past, and wherein the control causes the light to be sent from the light sending unit in a case where the information corresponding to the at least one feature point extracted from a newly captured image is not included in the three-dimensional space model generated or updated in the past.

* * * * *